(12) United States Patent
Okubo

(10) Patent No.: US 11,738,681 B2
(45) Date of Patent: Aug. 29, 2023

(54) VEHICULAR LAMP

(71) Applicant: Ichikoh Industries, Ltd., Isehara (JP)

(72) Inventor: Yasuhiro Okubo, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 17/790,859

(22) PCT Filed: Dec. 24, 2020

(86) PCT No.: PCT/JP2020/048377
§ 371 (c)(1),
(2) Date: Jul. 5, 2022

(87) PCT Pub. No.: WO2021/140932
PCT Pub. Date: Jul. 15, 2021

(65) Prior Publication Data
US 2022/0371509 A1   Nov. 24, 2022

(30) Foreign Application Priority Data

Jan. 7, 2020  (JP) .................................. 2020-000915

(51) Int. Cl.
*B60Q 1/50* (2006.01)
*F21S 43/20* (2018.01)
(Continued)

(52) U.S. Cl.
CPC ................. *B60Q 1/50* (2013.01); *B60Q 1/34* (2013.01); *F21S 43/26* (2018.01); *F21V 5/04* (2013.01);
(Continued)

(58) Field of Classification Search
CPC ........ B60Q 1/34–425; B60Q 1/50–549; B60Q 2400/50; F21S 43/14–27; F21S 45/48;
(Continued)

(56) References Cited

U.S. PATENT DOCUMENTS 10,125,944 B2 * 11/2018 Matsumoto ............. F21S 41/43
2013/0107558 A1    5/2013 Tajima et al.
2020/0011501 A1    1/2020 Kunii et al.

FOREIGN PATENT DOCUMENTS

JP    2013-97874 A    5/2013
JP    2014-13779 A    1/2014
(Continued)

OTHER PUBLICATIONS

International Search report dated Feb. 16, 2021 in PCT/JP2020/048377, filed on Dec. 24, 2020, 2 pages.

*Primary Examiner* — Jason M Han
(74) *Attorney, Agent, or Firm* — Oblon, McClelland, Maier & Neustadt, L.L.P.

(57) ABSTRACT

To provide a vehicular lamp capable of making a desired light distribution on a light shielding member while having a simple configuration. The vehicular lamp comprises a first and second light source each having a light emitting surface and being arranged in a predetermined parallel direction; a single condenser lens for condensing light emitted from the first and second light source; a light shielding member provided with an irradiation slit through which light condensed by the condenser lens is partially passed; and a projection lens for projecting light passed through the light shielding member to form an irradiation pattern. The first and second light source are arranged with an interval equal to or larger than dimensions in the parallel direction on the light emitting surfaces, the condenser lens makes a light distribution in which a high light quantity area with the highest light quantity is single in the parallel direction.

4 Claims, 15 Drawing Sheets

(51) Int. Cl.
*B60Q 1/34* (2006.01)
*F21V 5/04* (2006.01)
*G02B 27/18* (2006.01)
*F21Y 115/10* (2016.01)
*F21W 103/60* (2018.01)

(52) U.S. Cl.
CPC .......... *G02B 27/18* (2013.01); *B60Q 2400/50* (2013.01); *F21W 2103/60* (2018.01); *F21Y 2115/10* (2016.08)

(58) Field of Classification Search
CPC .. F21V 5/04; F21W 2103/10; F21W 2103/20; F21W 2103/45; F21W 2103/60; F21Y 2115/10; G02B 27/18
See application file for complete search history.

(56) References Cited

FOREIGN PATENT DOCUMENTS

| | | |
|---|---|---|
| JP | 2019-192350 A | 10/2019 |
| WO | WO 2018/139325 A1 | 8/2018 |

* cited by examiner

VEHICULAR LAMP

TECHNICAL FIELD

The present disclosure relates to a vehicular lamp.

BACKGROUND ART

A vehicular lamp is considered to form an irradiation pattern on a road surface around a vehicle.

In order to brighten the irradiation pattern, such a vehicular lamp is considered to have multiple light sources in a single projection optical system (see, for example, Patent Literature 1, etc.). The vehicular lamp forms a bright irradiation pattern by guiding light from multiple light sources onto a light shielding member with multiple light guides.

CITATION LIST

Patent Literature

Patent Literature 1: Japanese Unexamined Patent Application Publication No. 2019-192350

SUMMARY OF THE INVENTION

Problems to be Solved by the Invention

However, since the vehicular lamp has multiple light guides individually corresponding to multiple light sources, it has a complex configuration and it is difficult to adjust the light distribution on the light shielding member.

The present disclosure has been made in view of the above circumstance, and it is an object of the present invention to provide a vehicular lamp which, while having a simple configuration, can make a desired light distribution on the light shielding member.

Means for Solving the Problem

The vehicular lamp of the present disclosure comprising: a first light source and a second light source, each having a light emitting surface and being arranged in a predetermined parallel direction; a single condenser lens for condensing light emitted from the first light source and the second light source; a light shielding member provided with an irradiation slit through which light condensed by the condenser lens is partially passed; and a projection lens for projecting light passed through the light shielding member to form an irradiation pattern, wherein: the first light source and the second light source are arranged with an interval equal to or larger than dimensions in the parallel direction on the light emitting surface, the condenser lens makes a light distribution with a single high light quantity area with the highest light quantity in the parallel direction on the light shielding member.

Effect of the Invention

The vehicular lamp of the present disclosure, while having a simple configuration, can make a desired light distribution on the light shielding member.

BRIEF DESCRIPTION OF THE DRAWINGS

FIG. 13 is an explanatory diagram illustrating a light distribution on the filter when the first light source and the second light source are turned on.

MODE FOR CARRYING OUT THE INVENTION

Figure 1:
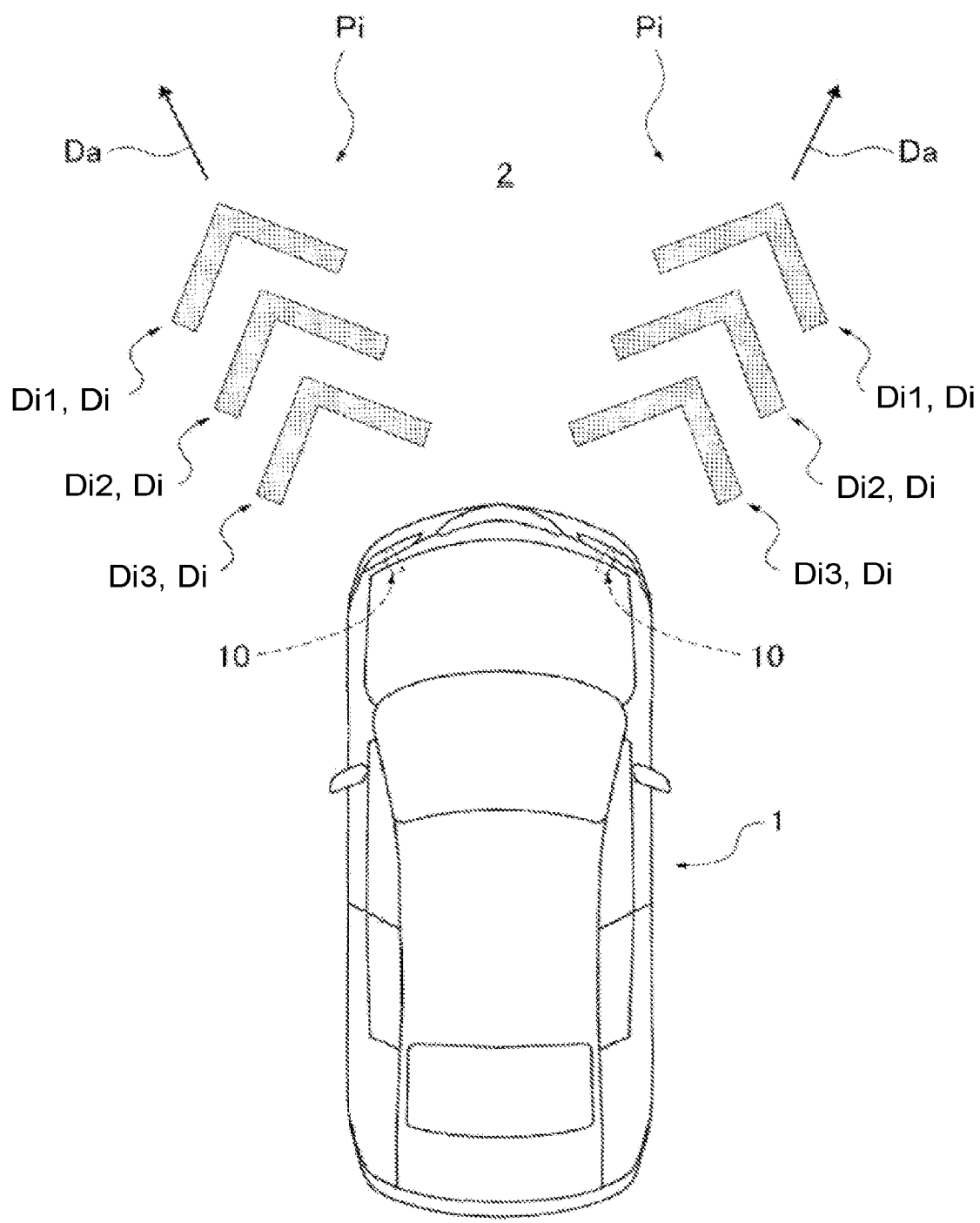
FIG. 1 is an explanatory diagram illustrating a state where a vehicular lamp according to a first embodiment of the present disclosure is mounted on a vehicle to form an irradiation pattern.

Hereinafter, a first embodiment of a vehicular lamp 10, which is an example of a vehicular lamp according to the present disclosure, will be described with reference to the drawings. Further, in order to facilitate understanding of the state where the vehicular lamp 10 is provided, FIG. 1 illustrates the vehicular lamp 10 in relation to the vehicle 1, with emphasis on the vehicular lamp 10, which does not necessarily correspond to the actual appearance. In addition, in FIGS. 6, 7, 9, and 10, the hatching on each cut section is omitted to facilitate understanding of the configuration of the condenser lens 12 and how the light progresses therethrough. Furthermore, in FIG. 6, an area corresponding to an intermediate range Mr is indicated with dots to facilitate understanding of the intermediate range Mr.

First Embodiment

The vehicular lamp 10 according to a first embodiment, which is an embodiment of a vehicular lamp according to the present disclosure, will be described using FIGS. 1 to 15. As illustrated in FIG. 1, the vehicular lamp 10 according to the first embodiment is used as a lamp for the vehicle 1 such as an automobile to form the irradiation pattern Pi on a road surface 2 in a front surrounding area of the vehicle 1, separately from a headlight provided in the vehicle 1. The front surrounding area of the vehicle 1 necessarily includes a proximity area that is closer to the vehicle 1 than a headlight area illuminated by the headlight provided in the vehicle 1 and may partially include the headlight area. In the first embodiment, the vehicular lamp 10 is located in a light chamber on both the left and right sides of the front part of the vehicle. The lamp chamber is formed such that an open front end of a lamp housing is covered by an outer lens. The vehicular lamp 10 is provided in the light chamber with a projection optical axis Lp inclined relative to the road surface 2. This is because the lamp chamber is positioned at a higher position than the road surface 2. In the following description, in the vehicular lamp 10, a direction in which the projection optical axis Lp extends, which is the direction to irradiate the light, is referred to as an optical axis direction (Z in the drawing), a vertical direction seen when the optical axis direction extends along a horizontal plane is referred to as an upper-lower direction (Y in the drawing), and a direction (horizontal direction) orthogonal to the optical axis direction and the upper-lower direction is referred to as a width direction (X in the drawing) (see FIG. 2, etc.).

Figure 2:
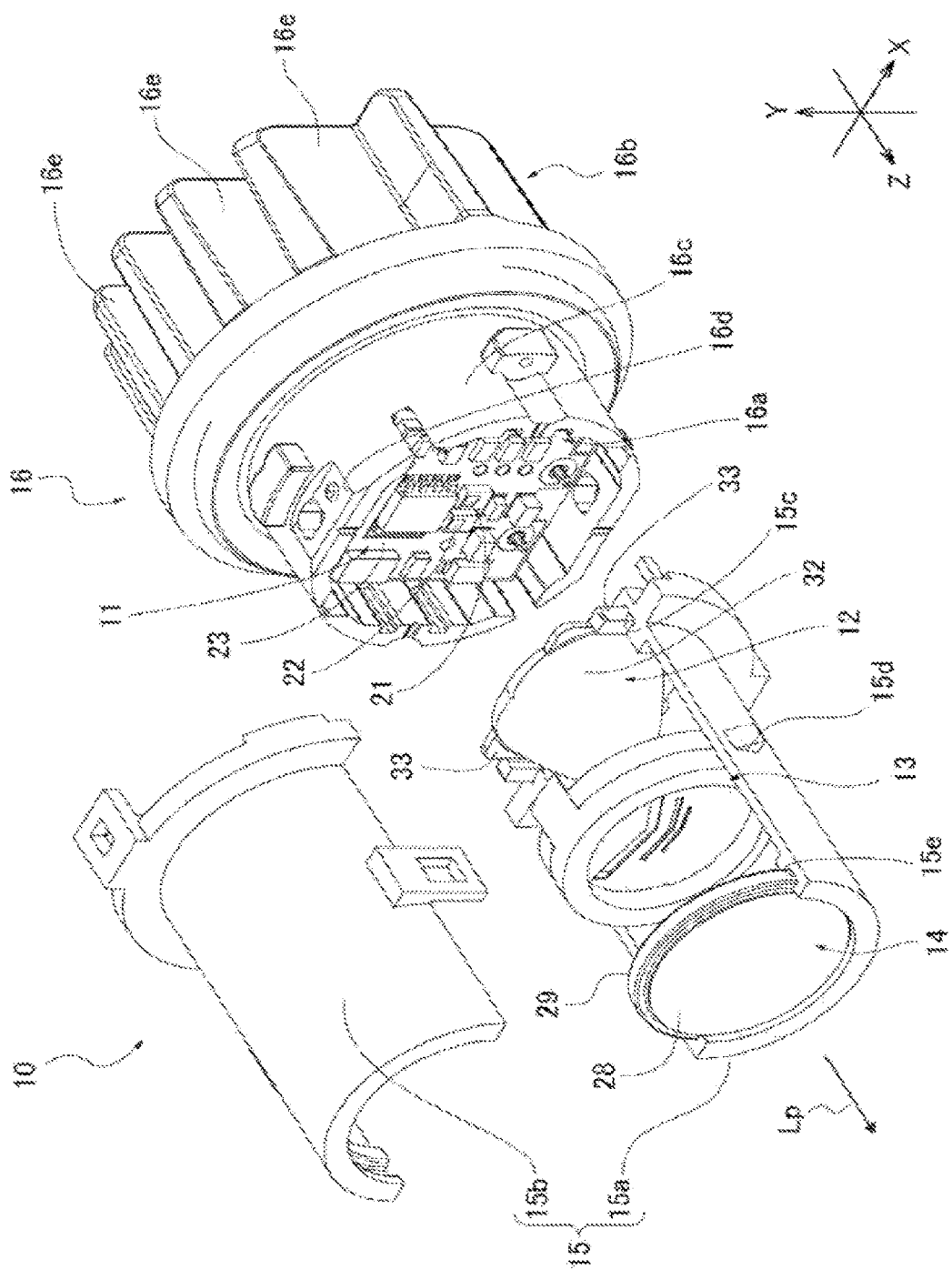
FIG. 2 is an explanatory diagram illustrating a configuration of the vehicular lamp according to the first embodiment.

As illustrated in FIG. 2, in the vehicular lamp 10, a light source part 11, a condenser lens 12, a filter 13, and a projection lens 14 are housed in a housing 15 to form a single projection optical system, constituting a projector-type road surface projection unit. The housing 15 includes semi-cylindrical lower and upper members 15a and 15b. With each of the above members (12 to 14) installed in the lower member 15a, the lower member 15a and the upper member 15b are fitted together via an installation base part 16. In the housing 15, a condenser lens groove 15c to fit the condenser lens 12 therein, a filter hole 15d to fit the filter 13 therein, and a projection lens groove 15e to fit the projection lens 14 therein are provided (illustrated only on the lower member 15a side). Further, the shape of the housing 15 may be appropriately set, and is not limited to the configuration of the first embodiment.

The installation base part 16 installs the light source part 11, is formed of die-cast aluminum or resin having thermal conductivity, and has an installation portion 16a and a heat dissipation portion 16b. The installation portion 16a is a portion where the light source part 11 (substrate 23 thereof) is installed, and is a flat plate orthogonal to the optical axis direction. The installation portion 16a is provided with a connecting wall 16c that surrounds the light source part 11. The connecting wall 16c is connected to the housing 15 when the lower member 15a and the upper member 15b are fitted together, with the tip 16d on the front side in the optical axis direction being sandwiched between the lower member 15a and the upper member 15b.

The heat dissipation portion 16b functions as a heat sink to dissipate heat generated by the light source part 11 to outside. This heat dissipation portion 16b is provided continuously with the installation portion 16a and has a plurality of heat dissipation fins 16e. The heat dissipation portion 16b radiates the heat generated by the light source part 11 installed at the installation portion 16a from each of the heat dissipation fins 16e to the outside.

The light source part 11 has a first light source 21, a second light source 22, and a substrate 23 on which the first light source 21 and the second light source 22 are mounted. The first light source 21 and the second light source 22 are composed of light emitting devices such as light emitting diodes (LED) and are arranged in a parallel direction Dp (see FIG. 3), and their emission optical axes Li are parallel to each other (see FIG. 6). Furthermore, when describing the emission optical axes Li individually, the one of the first light source 21 is referred to as a first emission optical axis Li1, and the one of the second light source 22 is referred to as a second emission optical axis Li2. In the first embodiment, the first light source 21 and the second light source 22 emit amber light (the one that is substantially close to monochromatic light in amber having the largest peak in a wavelength band of the amber in a graph having the light quantity as the vertical axis and the wavelength as the horizontal axis) with a Lambertian distribution having the emission optical axis Li as a center. Further, the first light source 21 and the second light source 22 may be set to any color (wavelength band), distribution mode, number of colors (number of peaks in the above graph), etc., as appropriate. The first light source 21 and the second light source 22 may emit light of other colors or white light, and are not limited to the configuration of the first embodiment.

Figure 3:
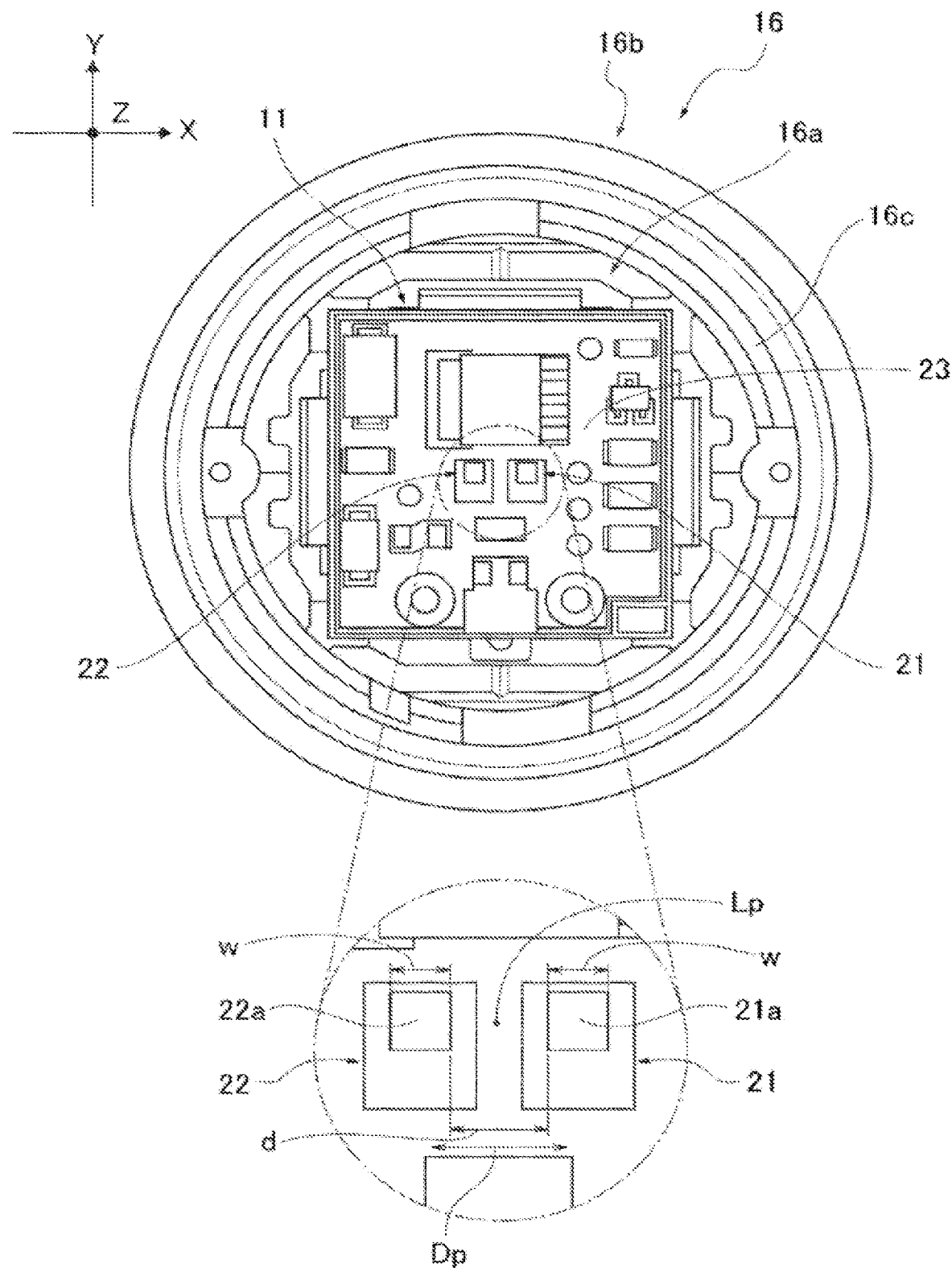
FIG. 3 is an explanatory diagram illustrating a first light source and a second light source provided on a substrate.

As illustrated in FIG. 3, the first light source 21 and the second light source 22 respectively have a first light emitting surface 21a and a second light emitting surface 22a, and the first light emitting surface 21a and the second light emitting surface 22a each have a rectangular shape when viewed in the optical axis direction. In the first embodiment, the first light emitting surface 21a and the second light emitting surface 22a are equal in shape and size to each other, and are in equal orientation to each other. The first light source 21 and the second light source 22 have a positional relation in which the first light emitting surface 21a and the second light emitting surface 22a are positioned with an interval d between them. In the first embodiment, the parallel direction Dp is parallel to the width direction. The interval d is equal to or larger than the size dimensions in the width direction (width dimension w) of the first light emitting surface 21a and the second light emitting surface 22a.

The substrate 23 is attached to the installation portion 16a of the installation base part 16, and the first light source 21 and the second light source 22 are mounted on the substrate 23. The substrate 23 is provided with a lighting control circuit, from which power is appropriately supplied to turn on the first light source 21 and the second light source 22. When the substrate 23 is attached to the installation portion 16a of the installation base part 16 and the housing 15 is connected to the connecting wall 16c, the substrate 23 is positioned at the rear end of the housing 15 (the end on the side opposite to the projection lens groove 15e in the optical axis direction), and is placed opposite to the condenser lens 12 (its incidence surface 31) housed in the housing 15.

As illustrated in FIG. 2, the condenser lens 12 condenses the light emitted from the first light source 21 and the second light source 22, onto the filter 13. In the first embodiment, the condenser lens 12 is basically a biconvex lens, and the incidence surface 31 and the emission surface 32 (see FIG. 6, etc.) are each a free curved face. The optical settings at the incidence surface 31 and the emission surface 32 are described below. In the condenser lens 12, flange parts 33 are provided at both ends in the width direction. Each of the flange parts 33 may be fitted into the condenser lens groove 15c of the housing 15. The condenser lens 12 has a lens axis Lr extending in the optical axis direction. The lens axis Lr is an axis that is the optical center in the condenser lens 12. In the condenser lens 12, when the flange parts 33 are fitted into the condenser lens groove 15c, the extending direction of the lens axis Lr is caused to coincide with the projection optical axis Lp.

Figure 4:
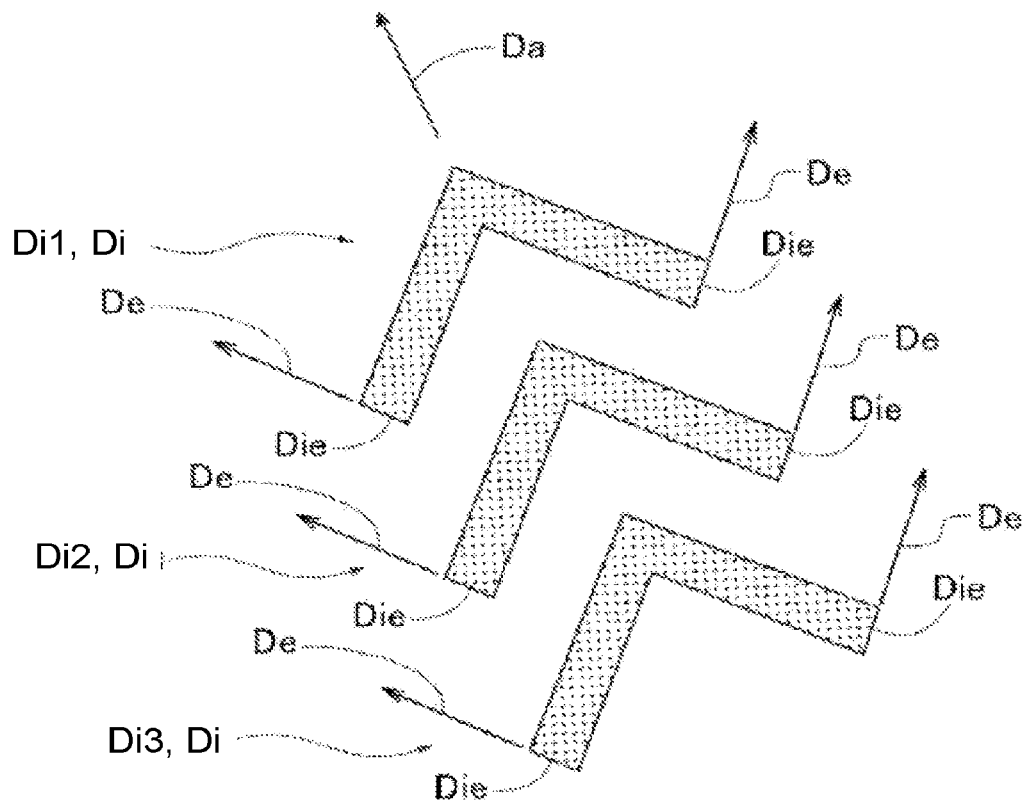
FIG. 4 is an explanatory diagram illustrating an irradiation pattern projected on a road surface.

Filter 13 is an example of a light shielding member that forms the irradiation pattern Pi by partially passing light from the first light source 21 and the second light source 22 condensed by the condenser lens 12. As illustrated in FIG. 1, the irradiation pattern Pi has three irradiation drawing patterns Di aligned at substantially equal intervals in a direction away from the vehicle 1. As illustrated in FIG. 4, each irradiation drawing pattern Di is of a large open V-shape and is of a substantially equal size to each other. When each irradiation drawing pattern Di is individually illustrated, the one farthest from the vehicle 1 is designated as a first irradiation drawing pattern Di1, and the others are respectively designated as a second irradiation drawing patterns Di2 and a third irradiation drawing patterns Di3 as they sequentially approach the vehicle 1 from there. Due to this, in the irradiation pattern Pi, the first irradiation drawing pattern Di1 is the farthest part and the third irradiation drawing pattern Di3 is the nearest part. The irradiation pattern Pi can look like an arrow pointing in a predetermined direction from the vehicle 1 by arranging each of the three irradiation drawing patterns Di with the vertices of the V-shaped pattern positioned in a substantially straight line. The direction that the arrow as the irradiation pattern Pi points, i.e., the direction in which the V-shaped vertices of each irradiation drawing pattern Di are arranged, is designated as an arrow direction Da, and the side to which the arrow points (the side of the first irradiation drawing pattern Di1) is designated as a front side of the arrow direction Da.

In each irradiation drawing pattern Di, two side ends Die located in a direction orthogonal to the arrow direction Da are straight lines with an inclination toward the inside (inside as viewed from the side that the vehicle turns to, indicated by the arrow direction Da) as going toward the rear side of the arrow direction Da. In other words, the two side ends Die in each irradiation drawing pattern Di are inclined inward with respect to the arrow direction Da. The directions in which the straight lines at the both side ends Die extend are each designated as a side end direction De. The irradiation pattern Pi consisting of these three irradiation drawing patterns Di is formed by the filter 13. The filter 13 is of equal configuration regardless of whether it is installed on the left or right side of the vehicle 1.

Figure 5:
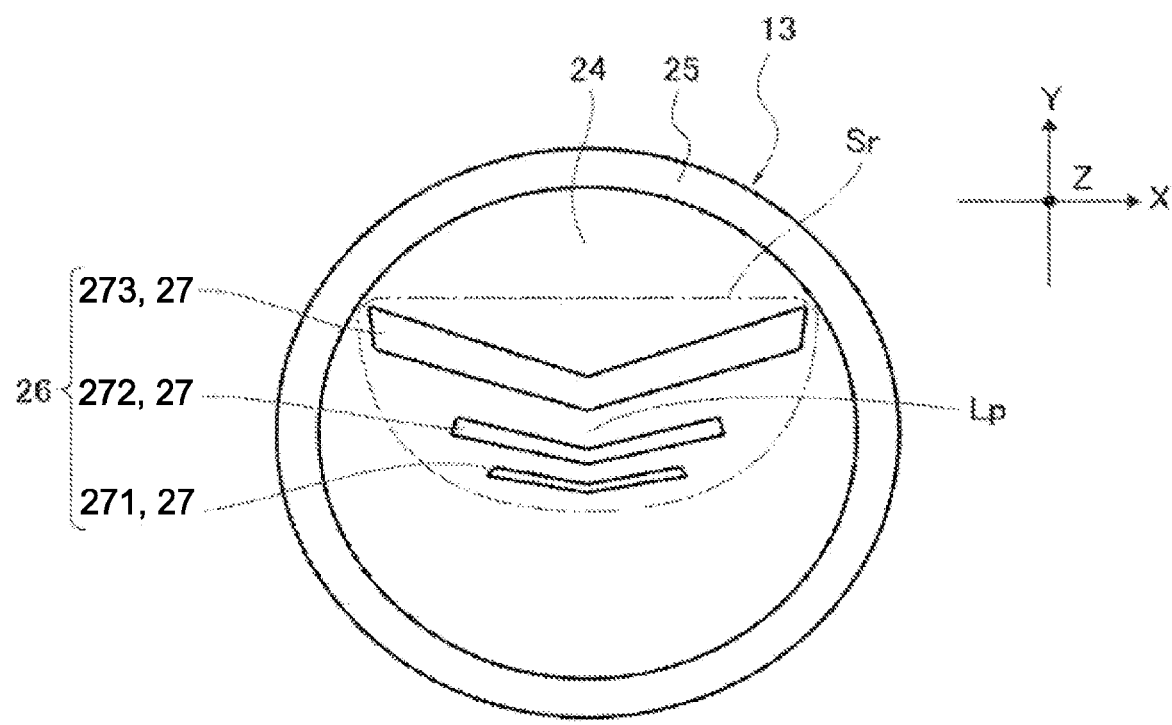
FIG. 5 is an explanatory diagram illustrating a filter.

In the filter 13, as illustrated in FIG. 5, a filter part 24 is provided in a filter frame part 25. The filter frame part 25 is a circular frame that surrounds the filter part 24 and can be fitted into the filter hole 15d of the housing 15 (see FIG. 1).

The filter part 24 is basically formed of a plate-shaped film member that blocks the transmission of light, and is provided with an irradiation slit 26. The irradiation slit 26 partially transmits the light from the first light source 21 and the second light source 22 condensed by the condenser lens 12 thereby to form the irradiation pattern Pi into a predetermined shape. The irradiation slit 26 is caused to correspond to the irradiation pattern Pi, and, in the first embodiment, is composed of three slit parts 27. The three slit parts 27 correspond, one-to-one, to the three irradiation drawing patterns Di, and are each made in the form of a large open V-shape similar to each irradiation drawing pattern Di, and are made to have different sizes and different intervals from each other, unlike each irradiation drawing pattern Di. In detail, the vehicular lamp 10 is provided with the projection optical axis Lp inclined relative to the road surface 2, so that the distances from the filter 13 and the projection lens 14 to the road surface 2 differ, so that with a projection on the road surface 2 by the projection lens 14, each slit part 27 (each irradiation drawing pattern Di which is the light transmitted therethrough) has a size and an interval which correspond to the distance. Due to this, the size and interval of each slit part 27 are set according to the distance to the road surface 2 so that each irradiation drawing pattern Di has substantially equal size and substantially equal interval on the road surface 2.

In addition, each slit part 27 is in a positional relation rotational symmetrical around the projection optical axis Lp, relative to the positional relation of each irradiation drawing pattern Di of the irradiation pattern Pi. In other words, the vehicular lamp 10 is provided with each slit part 27 in a manner that each irradiation drawing pattern Di is in a targeted positional relation on the road surface 2, by taking into consideration that the projection lens 14 inverts and projects the filter 13 (irradiation slit 26) to the road surface 2. Due to this, concerning each slit part 27, a first slit part 271 at the lowermost side in the upper-lower direction is the farthest location that corresponds to the first irradiation drawing pattern DA (farthest part) of the irradiation pattern Pi. Then, concerning each slit part 27, a second slit part 272 at the upper side of the first slit part 271 is a location that corresponds to the second irradiation drawing pattern Di2, and a third slit part 273 at the uppermost side is the nearest location that corresponds to the third irradiation drawing pattern Di3 (nearest part). In the filter 13 of the first embodiment, the third slit part 273 is provided above the projection optical axis Lp in the upper-lower direction, and the second slit part 272 is provided below the third slit part 273, straddling the horizontal line including the projection optical axis Lp, and the first slit part 271 is provided below the second slit part 272. The light transmitted through the filter 13 (each slit part 27 of the irradiation slit 26) is projected on the road surface 2 by the projection lens 14.

As illustrated in FIG. 2, the projection lens 14 has a lens body part 28, which is a circular convex lens when viewed in the optical axis direction, and a flange part 29 surrounding a periphery of the lens body part 28. In the first embodiment, both the incidence surface and the emission surface of the lens body part 28 are free curved faces that are convex, and are smoothly curvature-changed surfaces with no steps (at least C2 class function). The projection lens 14 has a lens axis extending in the optical axis direction. This lens axis is an optical axis that passes through the position where the thickness in the optical axis direction is the largest in the lens body part 28. The lens body part 28 projects the irradiation slit 26 of the filter 13 (each slit part 27 thereof) to form the irradiation pattern Pi on the road surface 2 inclined with respect to the projection optical axis Lp, as illustrated in FIG. 1, etc. Further, the incidence surface and the emission surface may be convex or concave, and are not limited to the configuration of the first embodiment, as long as the lens body part 28 is a convex lens.

The flange part 29 protrudes from the lens body part 28 in a radial direction with the lens axis as a center, and extends around the entire circumference in a circumferential direction with the lens axis as a center. The flange part 29 is capable of being fitted into the projection lens groove 15e of the housing 15. Concerning the projection lens 14, when the flange part 29 is fitted into the projection lens groove 15e, the lens axis is caused to coincide with the projection optical axis Lp.

Next, the optical setting of the condenser lens 12 will be described using FIGS. 6 to 14. FIG. 8 and FIGS. 11 to 14 show that the darker the color, the relatively brighter, and the lighter the color, the relatively darker.

Figure 14:
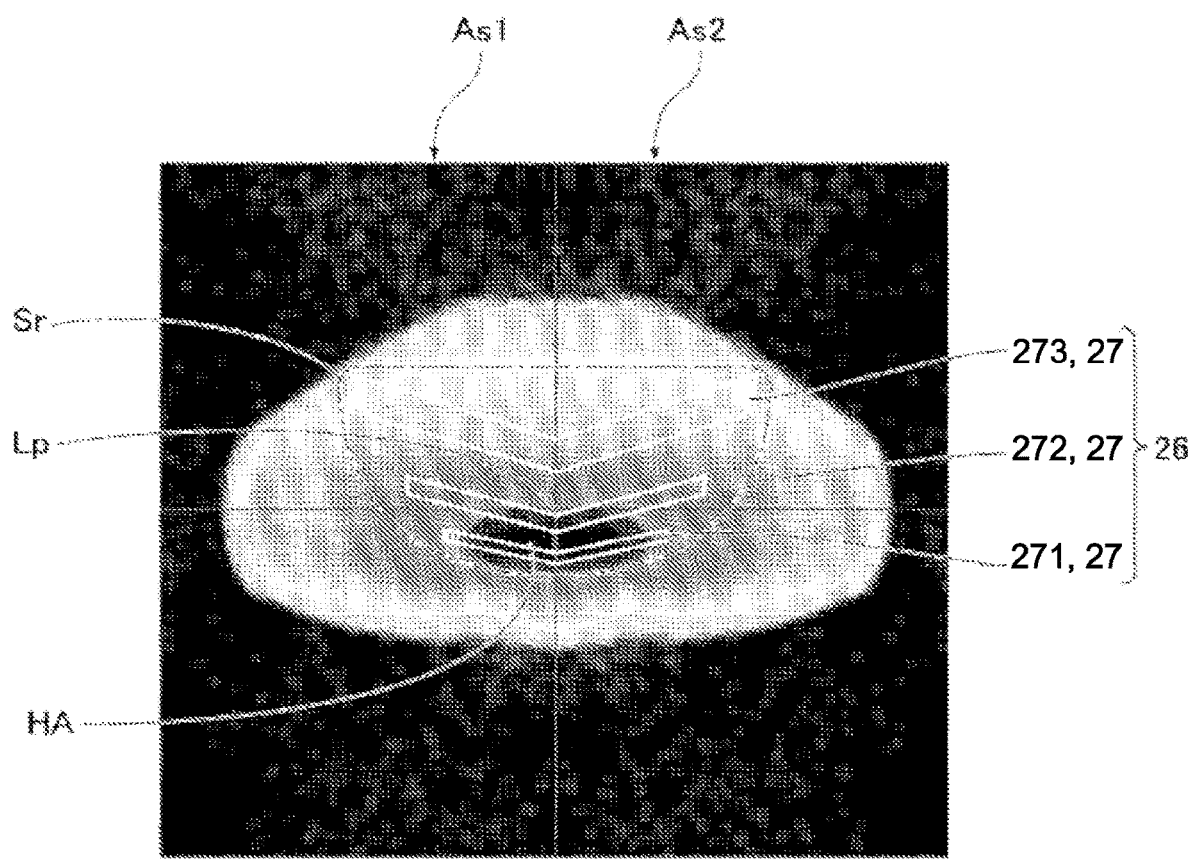
FIG. 14 is an explanatory diagram illustrating each irradiation slit superimposed on the light distribution in FIG. 13.

First, the condenser lens 12 basically condenses the light from the first light source 21 and the second light source 22, thereby causing the light to be irradiated with a light distribution including the setting range Sr (see FIG. 5) in the filter 13 (see FIG. 14). The setting range Sr is, in the first embodiment, the range in which the irradiation slit 26 (each slit part 27 thereof) is provided in the filter 13. Further, the setting range Sr may be set to any shape according to the shape of the irradiation slit 26, and is not limited to the configuration of the first embodiment. In the following, a direction orthogonal to the projection optical axis Lp is defined as a radial direction.

Figure 6:
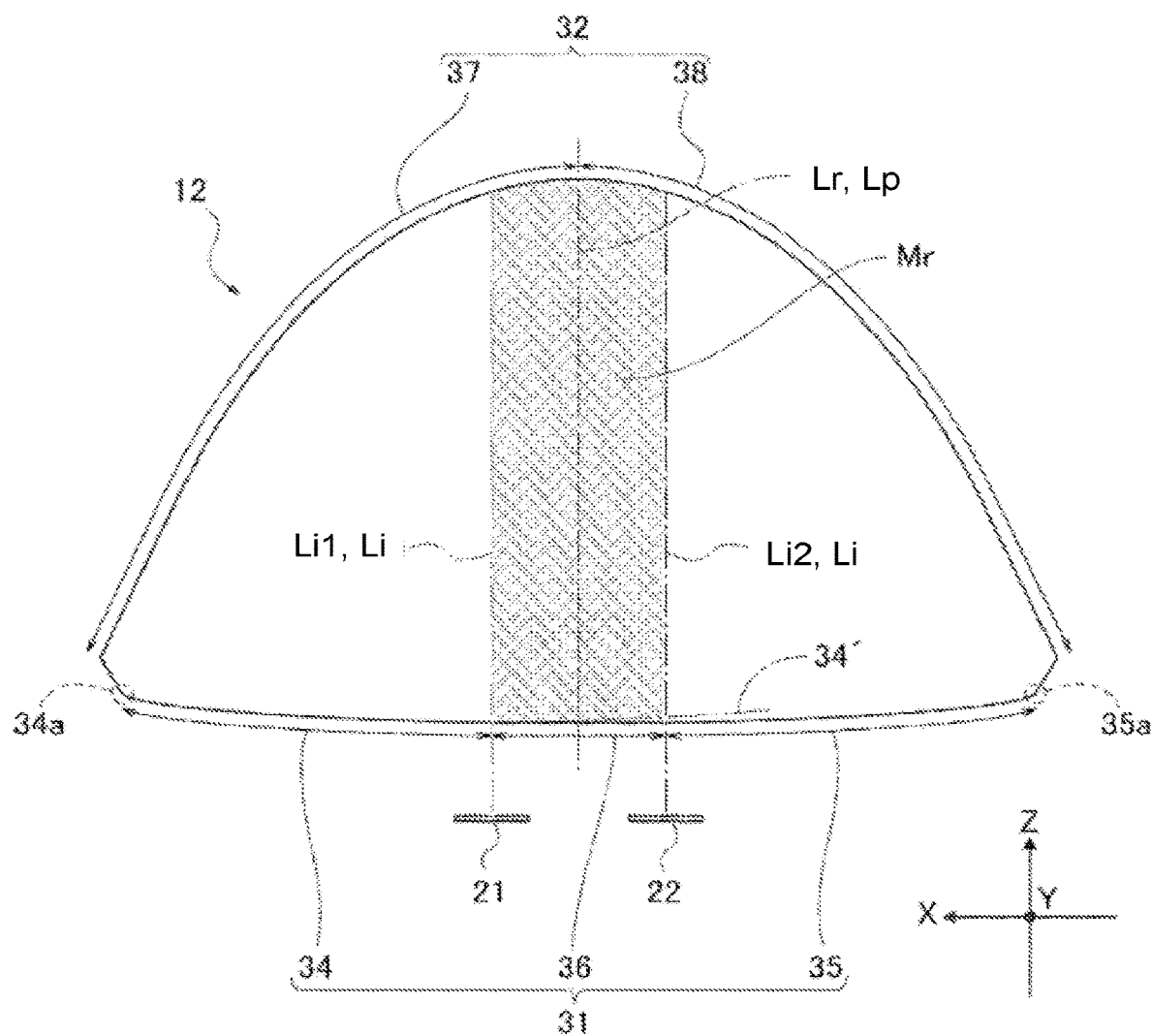
FIG. 6 is an explanatory diagram illustrating a configuration of a condenser lens on a cross section that includes an optical axis direction and a width direction.

As illustrated in FIG. 6, the condenser lens 12 has a configuration in which the incidence surface 31 is line-symmetrical with respect to the lens axis Lr in a cross section including the optical axis direction and the width direction (parallel direction Dp). In other words, the condenser lens 12 has a plane-symmetrical configuration with respect to a plane that includes the lens axis Lr and is orthogonal to the width direction. The condenser lens 12 has a first incidence surface part 34, a second incidence surface part 35, and an intermediate incidence surface part 36. The first incidence surface part 34 is optically set with respect to the first light source 21, that is, on the basis of the first light emitting surface 21a thereof, and is provided at the front side of the first light source 21 in the optical axis direction and the outer side of the width direction (the side opposite to the second light source 22). The second incidence surface part 35 is optically set with respect to the second light source 22, that is, on the basis of the second light emitting surface 22a thereof, and is provided at the front side of the second light source 22 in the optical axis direction and the outer side of the width direction (the side opposite to the first light source 21). The intermediate incidence surface part 36 is provided at the front side of the first light source 21 and the second light source 22, between the first incidence surface part 34 and the second incidence surface part 35, and is positioned on the lens axis Lr. On the cross-section of the incidence surface 31 of the first embodiment, the first emission optical axis Li1 of the first light source 21 is a boundary between the first incidence surface part 34 and the intermediate incidence surface part 36, and the second emission optical axis Li2 of the second light source 22 is the boundary between the second incidence surface part 35 and the intermediate incidence surface part 36.

In the longitudinal section of the condenser lens 12 including the optical axis direction and the upper-lower direction, the incidence surface 31 is a curved surface convex to a rear side in the optical axis direction, and the emission surface 32 is a curved surface convex to a front side in the optical axis direction. At this time, the condenser lens 12 adjusts the curvature in the respective longitudinal sections of the incidence surface 31 and the emission surface 32 so as to make the desired light distribution in the upper-lower direction in the setting range Sr of the filter 13 (see FIG. 13, etc.). In the first embodiment, the light distribution in the setting range Sr of the filter 13 is brightest at an area near and lower than the projection optical axis Lp in the upper-lower direction, and becomes progressively darker as getting away from the area. As a result, the light distribution on the filter 13 is asymmetrical at the upper and lower sides in the longitudinal section with respect to the line extending in the width direction including the projection optical axis Lp.

In addition, as illustrated in FIG. 6, in the cross section of the incidence surface 31 of the condenser lens 12, the first incidence surface part 34 and the second incidence surface part 35 are curved surfaces convex to the rear side in the optical axis direction, and the intermediate incidence surface part 36 is a plane parallel to the width direction (parallel direction Dp). In other words, the intermediate incidence surface part 36 is designed to have refractive power only in the upper-lower direction while extending in the width direction, similar to a cylindrical lens. The first incidence surface part 34 is optically set on the basis of the light from the center of the first light emitting surface 21a of the first light source 21, and the second incidence surface part 35 is optically set on the basis of the light from the center of the second light emitting surface 22a of the second light source 22. Due to this, on the incidence surface 31, a sub-lens axis is set on the first emission optical axis Li1 of the first light source 21 and a sub-lens axis is set on the second emission optical axis Li2 of the second light source 22.

In addition, in the cross section of the condenser lens 12, the emission surface 32 is a curved surface convex to the front side in the optical axis direction. In the cross section of the emission surface 32, a half of the emission surface 32 on the first incidence surface part 34 side in the width direction from the lens axis Lr is designated as a first emission surface part 37, and the other half is designated as a second emission surface part 38. In addition, in the condenser lens 12, the range where the intermediate incidence surface part 36 is provided in the width direction is defined as the intermediate range Mr. In other words, the intermediate range Mr is the range opposite to the intermediate incidence surface part 36 in the optical axis direction, and is the range located at a front side of the intermediate incidence surface part 36 in the optical axis direction. Then, in the cross section of the condenser lens 12, the curvatures of the first incidence surface part 34 and the second incidence surface part 35, and the emission surface 32, are set as follows.

Figure 7:
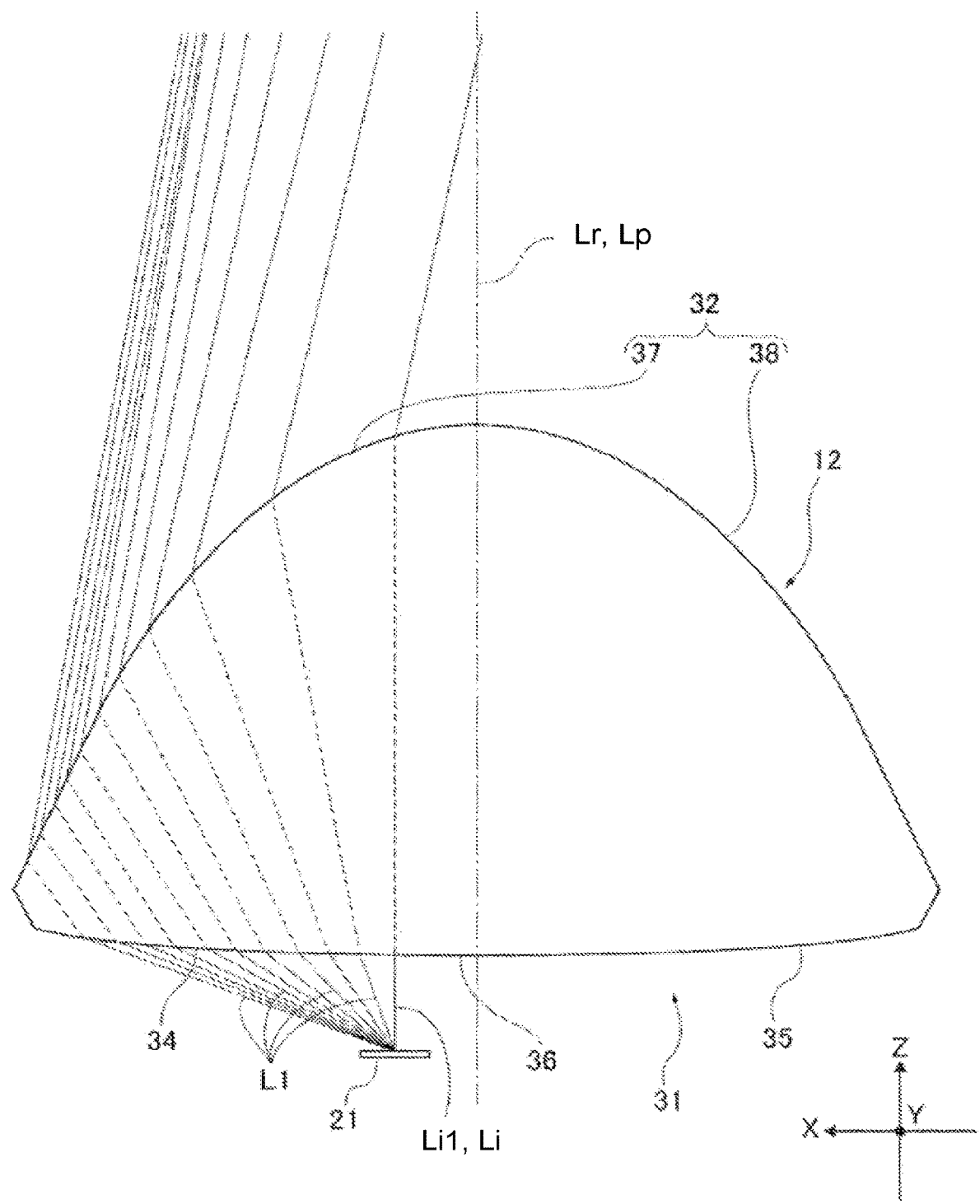
FIG. 7 is an explanatory diagram illustrating a progression of light transmitted through the condenser lens from the first light source via a first incidence surface part on a cross section in the vehicular lamp.

As illustrated in FIG. 7, in the cross section, the condenser lens 12 sets the curvature of the first incidence surface part 34 and the first emission surface part 37, with the light L1 emitted from the first light source 21 and incident from the first incidence surface part 34 as the object of control. In the cross section, the condenser lens 12 causes light that is near the first emission optical axis Li1 among the light L1 to diverge gradually while progressing in the direction that intersects the projection optical axis Lp before reaching the filter 13. In addition, in the cross section, the condenser lens 12 causes the remaining light among the light L1 to diverge gradually while proceeding toward the projection optical axis Lp side without intersecting the projection optical axis Lp before reaching the filter 13. At this time, the curvatures of the first emission surface part 37 and the first incidence surface part 34 are set together so that the vertex is located in the intermediate range Mr.

Figure 8:
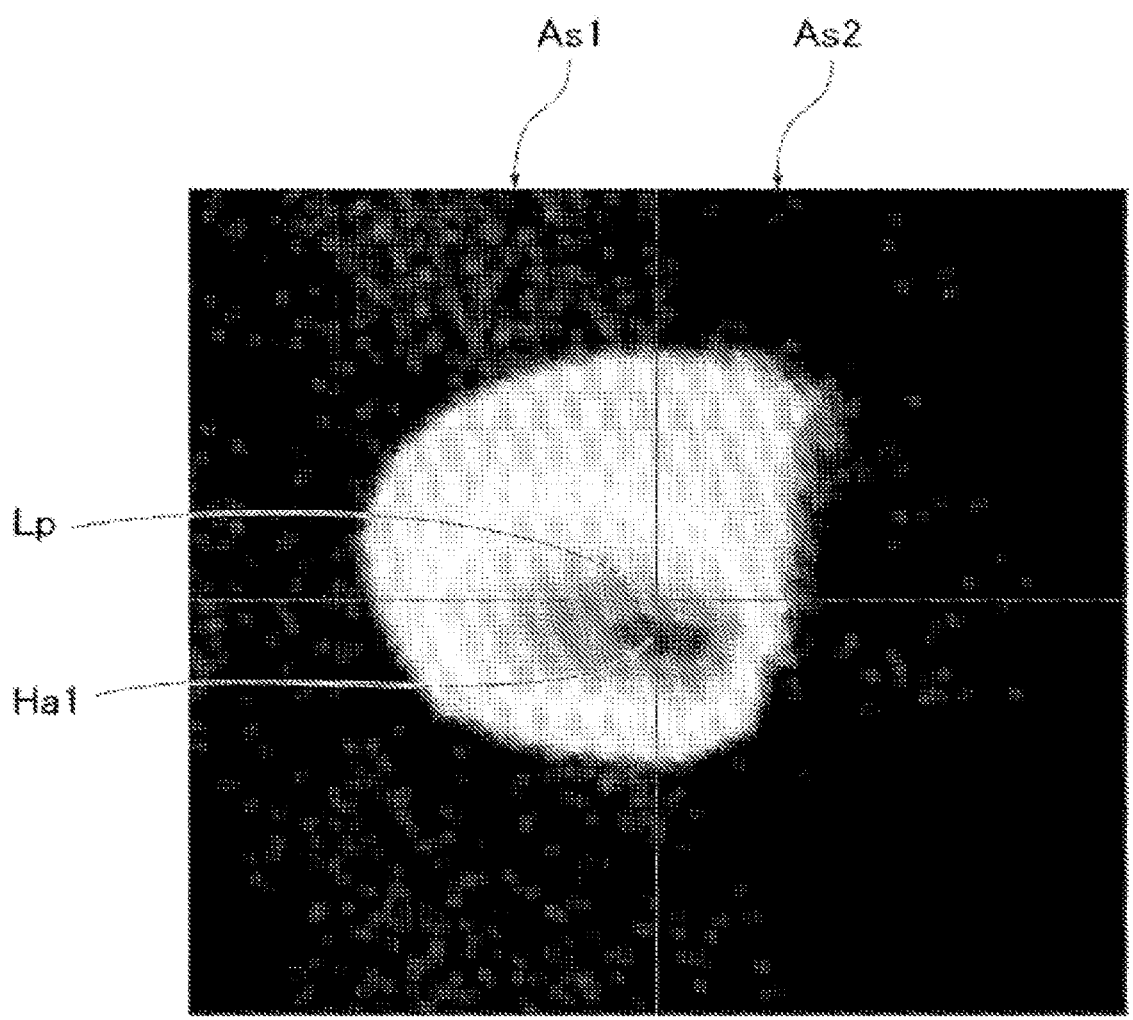
FIG. 8 is an explanatory diagram illustrating a light distribution on the filter caused by the light illustrated in FIG. 7.

The condenser lens 12 is set to the optical settings described above, thereby causing the light L1 to be irradiated onto the filter 13 to make the desired light distribution as illustrated in FIG. 8. Here, in the filter 13, a side of the first incidence surface part 34 (the first light source 21) in the width direction from the projection optical axis Lp is designated as a first light shielding area As1, and the opposite side, that is, a side of the second incidence surface part 35 (the second light source 22) in the width direction, is designated as a second light shielding area As2.

By irradiating the light L1 on the filter 13, a high light quantity portion Ha1 that has the highest light quantity in this light distribution (peak of light quantity) is formed near and lower than the projection optical axis Lp. The high light quantity portion Ha1 has a long shape that straddles a vertical line passing through the projection optical axis Lp and extends in the width direction to both the first light shielding area As1 and the second light shielding area As2. Then, by irradiating the light L1 on the filter 13, a light distribution is formed over a predetermined vertical and horizontal range within the setting range Sr with the high light quantity portion Ha1 as a center. In the light distribution caused by the light L1, the brightness gradually changes in a manner that it becomes darker as it moves away from the high light quantity portion Ha1, i.e., the closer it gets to the periphery of the setting range Sr, the darker it becomes, and a single high light quantity portion Ha1 is formed. Further, on the filter 13, the light L1 irradiates the area extending from the vicinity of the center in the setting range Sr to the first light shielding area As1 side, and does not irradiate the entire area of the setting range Sr.

In the condenser lens 12, in the cross section, the curvatures of the second incidence surface part 35 and the second emission surface part 38 are set using the first incidence surface part 34 and the first emission surface part 37 that are set as described above. The condenser lens 12 is, in the cross section, line-symmetrical with respect to the lens axis Lr, that is, it is plane-symmetrical with respect to a plane that includes the lens axis Lr and is orthogonal to the width direction. Then, the condenser lens 12, in the cross section, inverts the first incidence surface part 34 around the lens axis Lr in the cross section to set the second incidence surface part 35, and inverts the first emission surface part 37 around the lens axis Lr to set the second emission surface part 38.

By setting as described above, the first incidence surface part 34 is made to be a curved surface that is convex toward the first light source 21 side and has a vertex (the point closest to the first light source 21 side in the optical axis direction) in the width direction before reaching the lens axis Lr (See the double-dashed line 34' extending from the first incidence surface part 34 in FIG. 6). Due to this, a concavity (a depression curved to the emission surface 32 side in the optical axis direction) is formed near the lens axis Lr in the incidence surface 31 when the second incidence surface part 35 is set as lineally symmetrical around the lens axis Lr from the first incidence surface part 34 in the cross section. This concavity creates an unnecessarily bright area (see the portion surrounded by a dashed line in FIG. 11) within the setting range Sr.

Therefore, in the cross section of the condenser lens 12 of the first embodiment, the first incidence surface part 34 and the second incidence surface part 35 are made to extend from the outside ends 34a and 35a in the width direction to the emission optical axes (Li1, Li2) of the corresponding light sources (21, 22) respectively, and the intermediate incidence surface part 36 is made by connecting the first incidence surface part 34 and the second incidence surface part 35 with a line parallel to the width direction. The intermediate incidence surface part 36 is made to be continuous with the first incidence surface part 34 and the second incidence surface part 35, so that in longitudinal section, the intermediate incidence surface part 36 is made to be a curved surface convex to the rear side in the optical axis direction integrally with the first incidence surface part 34 and the second incidence surface part 35. The position of intermediate incidence surface part 36 in the width direction may be set as desired, and is not limited to the configuration of the first embodiment, as long as it is parallel to the width direction in the cross section without forming a concavity that causes an unnecessarily bright area when the first incidence surface part 34 and the second incidence surface part 35 are set as described above.

Since the emission surface 32 has a vertex of the first emission surface part 37 located in the intermediate range Mr, when the vertex is formed at a position exceeding the lens axis Lr in the width direction (on the side where the second light source 22 is provided), the emission surface 32 has a single vertex by being formed as described above. In addition, the emission surface 32 has two vertices by being formed as described above when the vertex of the first emission surface part 37 is formed at a position where the vertex does not exceed the lens axis Lr in the width direction (on the side where the first light source 21 is provided). Then, since the emission surface 32 is made line symmetrical around the lens axis Lr in the cross section in any case, the first emission surface part 37 and the second emission surface part 38 are made with no step difference (C0 class function) on the lens axis Lr.

Figure 9:
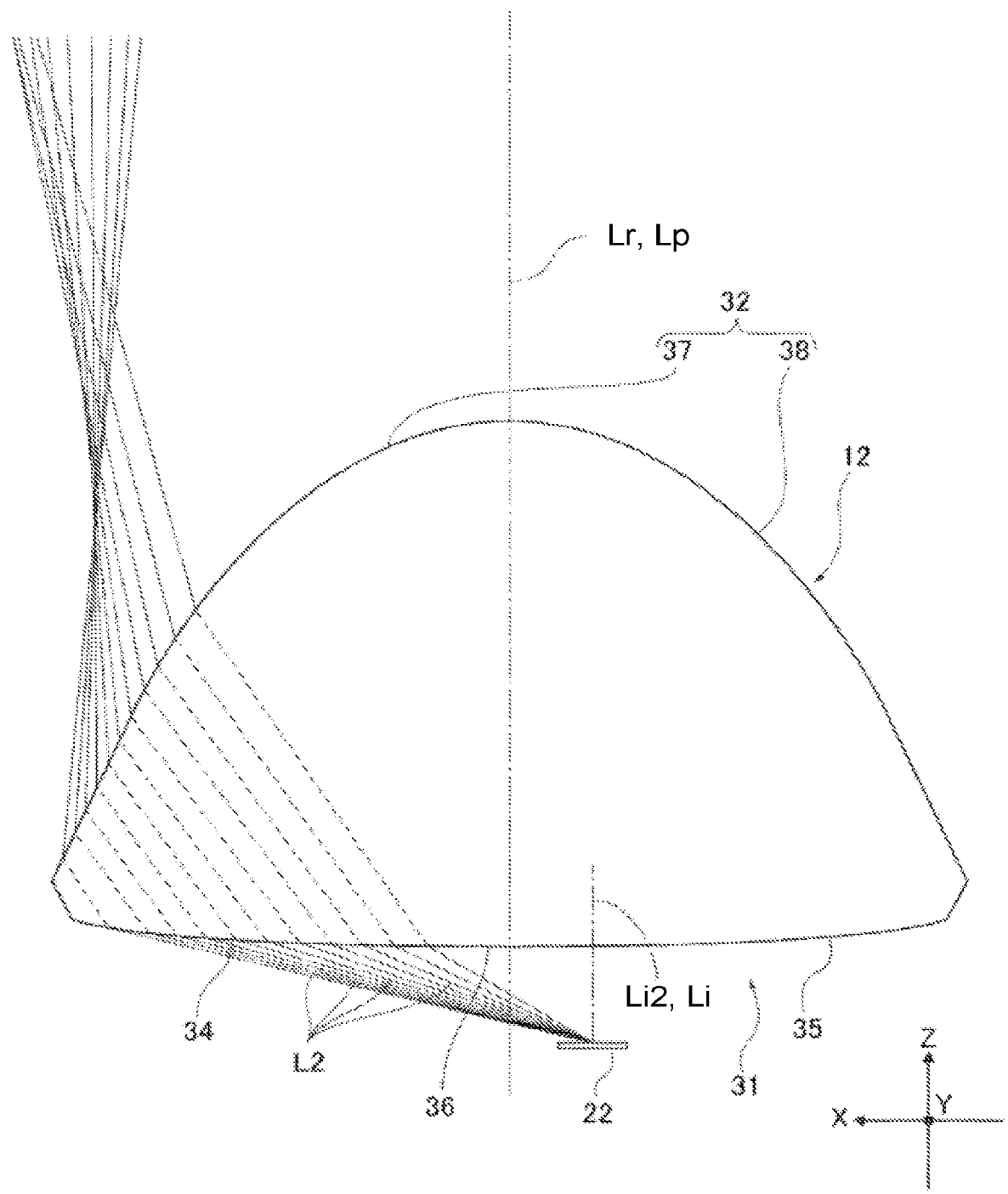
FIG. 9 is an explanatory diagram illustrating a progression of light transmitted through the condenser lens from the second light source via the first incidence surface part on a cross section in the vehicular lamp.

As illustrated in FIG. 9, the condenser lens 12 set up as described above emits, in the cross section, light that is near the outer side of the width direction, among the light L2 emitted from the second light source 22 and incident from the first incidence surface part 34, toward the lens axis Lr side. In addition, the condenser lens 12 emits, in the cross section, light on the lens axis Lr side among the light L2 toward a direction away from the lens axis Lr. In other words, the condenser lens 12 changes the direction of the light L2 in the cross section so that the light L2 is emitted in the direction from close to the lens axis Lr to away from the lens axis Lr as the incidence position becomes inner side of the width direction of the first incidence surface part 34. Due to this, in the cross section, the condenser lens 12 allows the light L2 to cross the direction in which it progresses and then to diverge gradually at a position away from the lens axis Lr.

Figure 10:
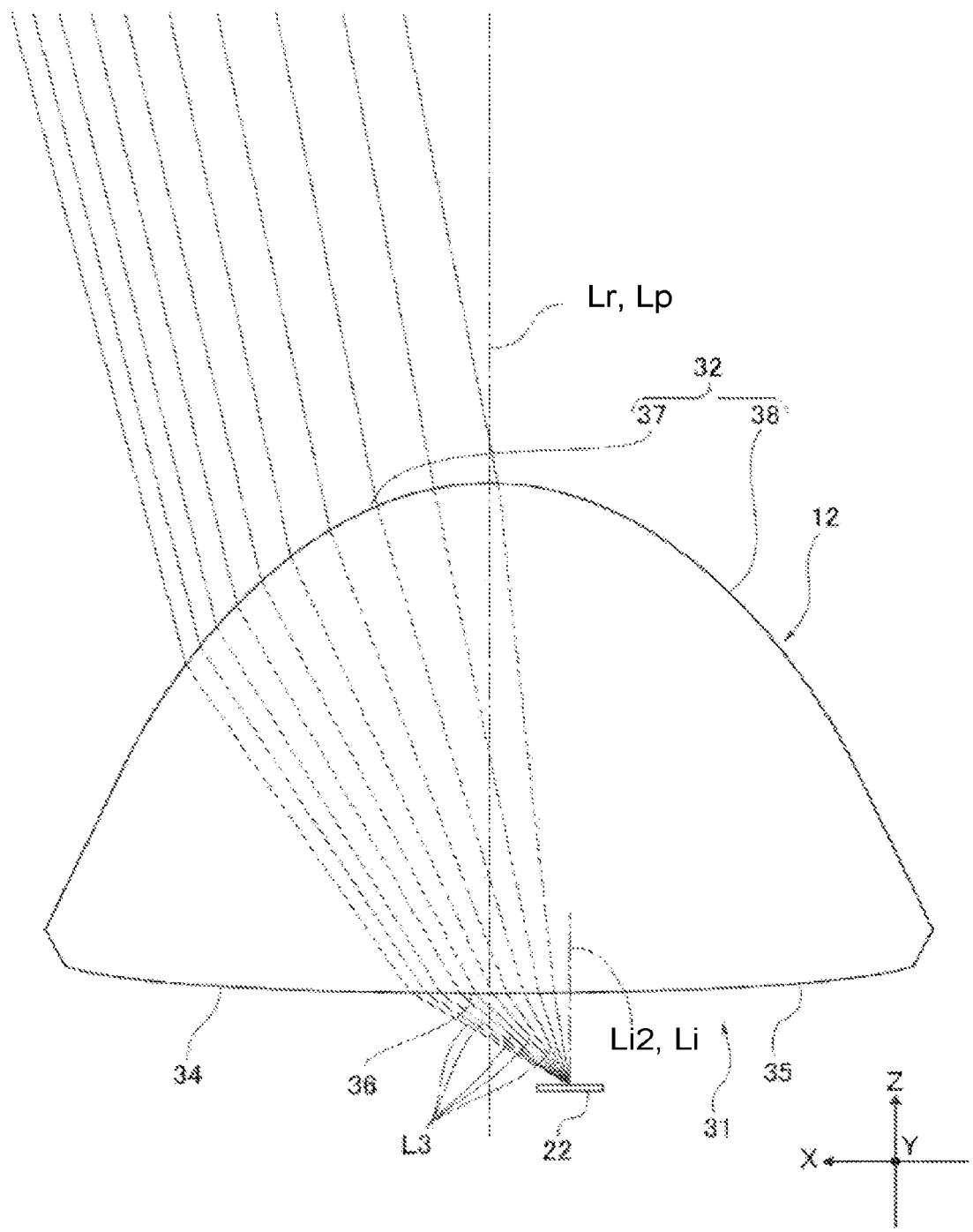
FIG. 10 is an explanatory diagram illustrating a progression of light transmitted through the condenser lens from the second light source via an intermediate incidence surface part on a cross section in the vehicular lamp.

As illustrated in FIG. 10, in the cross section, the condenser lens 12 set up as described above gradually diverges the light L3 emitted from the second light source 22 and incident from the intermediate incidence surface part 36 by emitting the light L3 in a direction gradually away from the lens axis Lr while diverging it.

Figure 11:
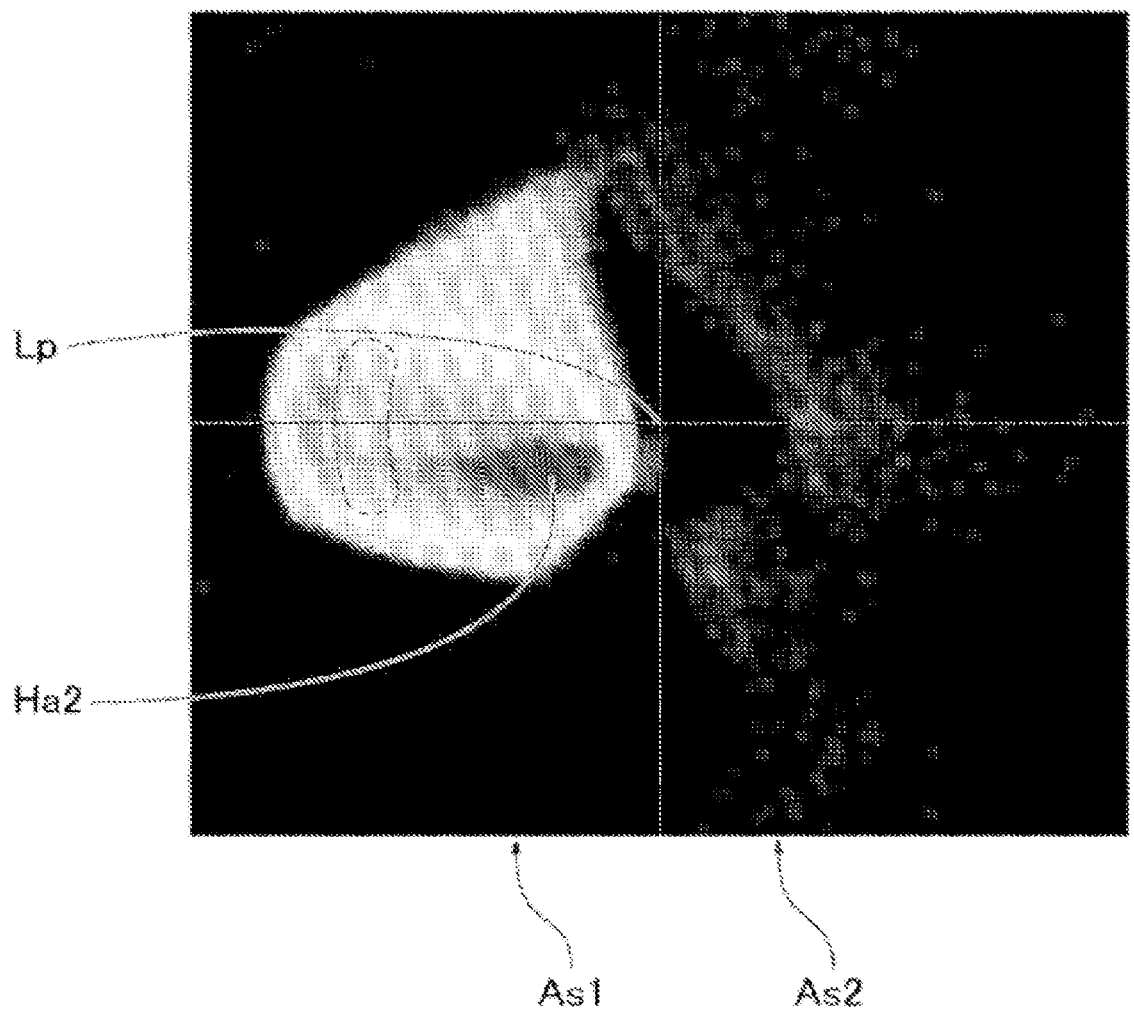
FIG. 11 is an explanatory diagram illustrating a light distribution on the filter caused by the light illustrated in FIG. 9 and the light illustrated in FIG. 10.

The condenser lens 12, when optically set up as described above, causes the light L2 and the light L3 from the second light source 22 passing through the first incidence surface part 34 and the intermediate incidence surface part 36 to be irradiated on the filter 13 as illustrated in FIG. 11. By irradiating the light L2 and the light L3 on the filter 13, a high light quantity portion Ha2 that has the highest light quantity in this light distribution (peak of light quantity) is formed near and lower than the projection optical axis Lp. The high light quantity portion Ha2 has a long shape extending in the width direction within the first light shielding area As1, and is aligned in the width direction with the above high light quantity portion Ha1 caused by the light L1 (see FIG. 8) while partially superimposing the high light quantity portion Ha1. Then, on the filter 13, with the high light quantity portion Ha2 as a center, a light distribution is formed over a predetermined vertical and horizontal range on the first light shielding area As1 side within the setting range Sr. In the light distribution, the brightness gradually changes in a manner that it becomes darker as it moves away from the high light quantity portion Ha2, i.e., the closer it gets to the periphery of the setting range Sr, the darker it becomes, and a single high light quantity portion Ha2 is formed.

Figure 12:
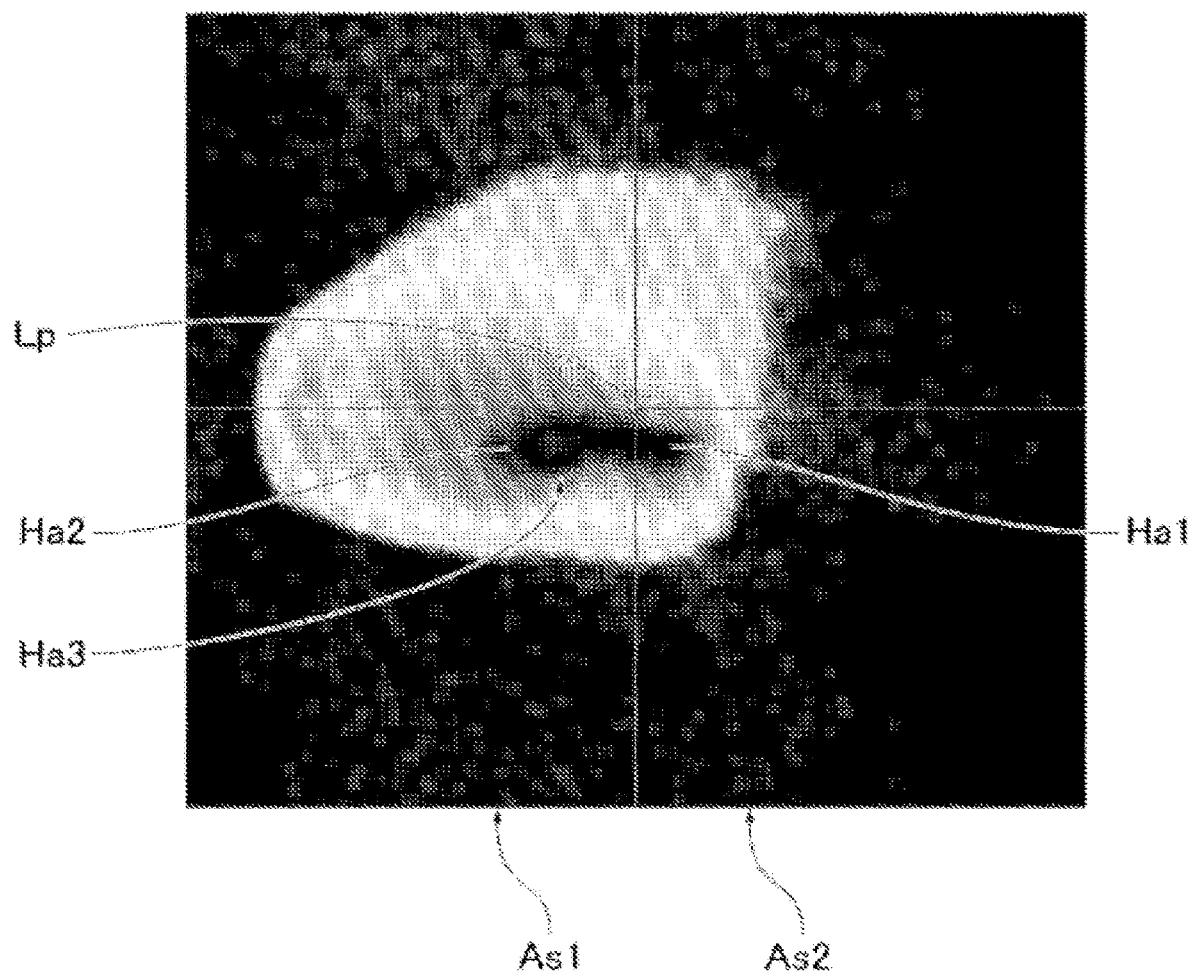
FIG. 12 is an explanatory diagram illustrating a light distribution that superimposes the light distribution in FIG. 8 and the light distribution in FIG. 11 on the filter.

On the filter 13, the light distribution caused by the light L1 (see FIG. 8) and the light distribution caused by the light L2 and the light L3 (see FIG. 11) are superimposed. Then, on the filter 13, As illustrated in FIG. 12, the high light quantity portion Ha1 and the high light quantity portion Ha2 are superimposed to form the high light quantity portion Ha3 that has the highest light quantity in this light distribution. This high light quantity portion Ha3 has a long shape near and lower than the projection optical axis Lp, which straddles a vertical line passing through the projection optical axis Lp and extends in the width direction to the first light shielding area As1 while partially located in the second light shielding area As2. Then, on the filter 13, with the high light quantity portion Ha3 as a center, a light distribution is formed over an area extending to the vicinity of the projection optical axis Lp in the second light shielding area As2 while filling the first light shielding area As1 side of the setting range Sr. In the light distribution, the brightness gradually changes in a manner that it becomes darker as it moves away from the high light quantity portion Ha3, i.e., the closer it gets to the periphery of the setting range Sr, the darker it becomes, and the light distribution has a single high light quantity portion Ha3.

Here, the light distribution on the filter 13 illustrated in FIG. 12 is formed by the light L1, the light L2, and the light L3 from the first light source 21 and the second light source 22 through the first incidence surface part 34 and the intermediate incidence surface part 36. And since the condenser lens 12 is configured to be line symmetrical with respect to the lens axis Lr in the cross section, the light distribution caused by the light from the first light source 21 and the second light source 22 through the second incidence surface part 35 and the intermediate incidence surface part 36 is made line symmetrical with respect to the projection optical axis Lp of the light distribution in FIG. 12.

Figure 13:
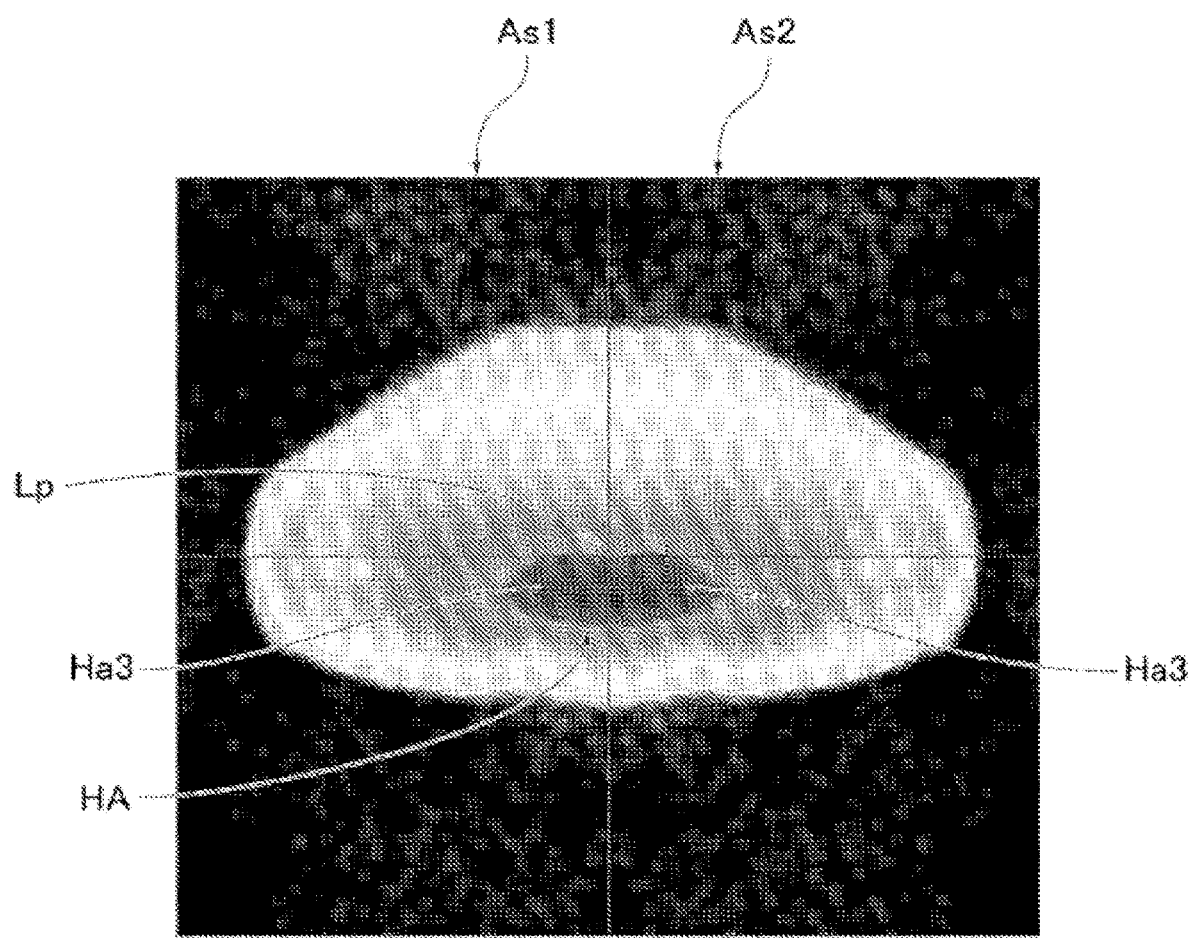

Consequently, when the first light source 21 and the second light source 22 are turned on, the light distribution in FIG. 12 and the light distribution that is line symmetrical to the light distribution in FIG. 12 with respect to the projection optical axis Lp are superimposed, thereby the light distribution illustrated in FIG. 13 is formed on the filter 13. On the filter 13, by superimposing both high light quantity portions Ha3, a high light quantity area HA is formed near and lower than the projection optical axis Lp, which straddles the projection optical axis Lp and is long in the width direction. The high light quantity area HA is an area of the highest light quantity in this light distribution (an area where the light quantity becomes peak) and is a so-called hot zone. On the filter 13, with the high light quantity area HA as a center, light is irradiated to fill the setting range Sr, and the brightness gradually changes in a manner that it becomes darker as it moves away from the high light quantity area HA, i.e., the closer it gets to the periphery of the setting range Sr, the darker it becomes. Thus, on the filter 13, a light distribution with a single high light quantity area HA (peak of light quantity) in the width direction (parallel direction Dp) is formed. At this time, on the filter 13, the brightness distribution expands in the width direction, and if the position is equal in the upper-lower direction, the brightness hardly changes even if the position in the width direction changes. That is, the condenser lens 12, in the width direction, diverges the light in a manner not to cause a difference in brightness compared to in the upper-lower direction, and causes the light from the first light source 21 and the second light source 22 to irradiate within the setting range Sr.

FIG. 14 illustrates how the light distribution illustrated in FIG. 13 is formed on each slit part 27 of the irradiation slit 26 in the filter 13. On the filter 13, the area within the setting range Sr is irradiated in a manner that the high light quantity area HA encompasses the almost entire area of the first slit part 271 and is the brightest (peak of light quantity), while the area within the setting range Sr is progressively darkened as moving away from the high light quantity area HA. In the setting range Sr, the brightness gradually changes in the order of the first to third slit parts 271, 272, and 273 so that in the upper-lower direction, the first slit part 271, which is the farthest portion, is the brightest and the third slit part 273, which is the nearest portion, is the darkest. At this time, in the setting range Sr, the brightness in the width direction is made to be approximately uniform at each slit part 27, i.e., at each position in the upper-lower direction. As a result, on the filter 13, the second slit part 272 is darker than the first slit part 271, and the third slit part 273 is darker than the second slit part 272, while the brightness of each slit part 27 in the width direction is approximately uniform.

The vehicular lamp 10 is assembled as below with reference to FIG. 2. First, the first light source 21 and the second light source 22 are mounted on the substrate 23 thereby to assemble the light source part 11, and the light source part 11 is fixed to the installation portion 16a thereby to form the installation base part 16. Then, in the lower member 15a of the housing 15, the condenser lens 12 is fitted into the condenser lens groove 15c, the filter 13 is fitted into the filter hole 15d, and the projection lens 14 is fitted into the projection lens groove 15e. The rear end of the lower member 15a of the housing 15 is then abutted to the lower side of the tip 16d of the connecting wall 16c, and the upper member 15b is fitted into the lower member 15a from the upper side. As a result, the condenser lens 12, the filter 13, and the projection lens 14 are housed in the housing 15 and the light source part 11 is connected to the housing 15. As a result, the condenser lens 12, the filter 13 and the projection lens 14 are arranged on the projection optical axis Lp in the above order from the light source part 11 side in a predetermined positional relation thereby to assemble the vehicular lamp 10.

Next, operations of the vehicular lamp 10 will be described. The vehicular lamp 10 is installed in the light chamber in a state in which the projection optical axis Lp is inclined relative to the road surface 2 around the vehicle 1 while being directed to diagonal front side outside the vehicle 1 (see FIG. 1). The vehicular lamp 10 can appropriately turn on and off the first light source 21 and the second light source 22 by supplying electric power from the lighting control circuit to the first light source 21 and the second light source 22 from the substrate 23. The light from the first light source 21 and the second light source 22 is condensed by the condenser lens 12 thereby to irradiate the filter 13, and after transmitted through the irradiation slit 26 (each slit part 27) thereof, is projected by the projection lens 14 thereby to form the irradiation pattern Pi on the road surface 2. The irradiation pattern Pi comprises three irradiation drawing patterns Di arranged in a substantially straight line with substantially equal brightness, when the light transmitted through the irradiation slit 26 of the filter 13 (each slit part 27 thereof), which is made with the light distribution as described above, is projected by the projection lens 14. In particular, in the vehicular lamp 10 of the first embodiment, the first light source 21 and the second light source 22 are monochromatic light sources, and therefore the influence of chromatic aberration in the projection lens 14 can be greatly suppressed, and the irradiation pattern Pi, i.e., each irradiation drawing pattern Di, can be made clear.

Figure 15:
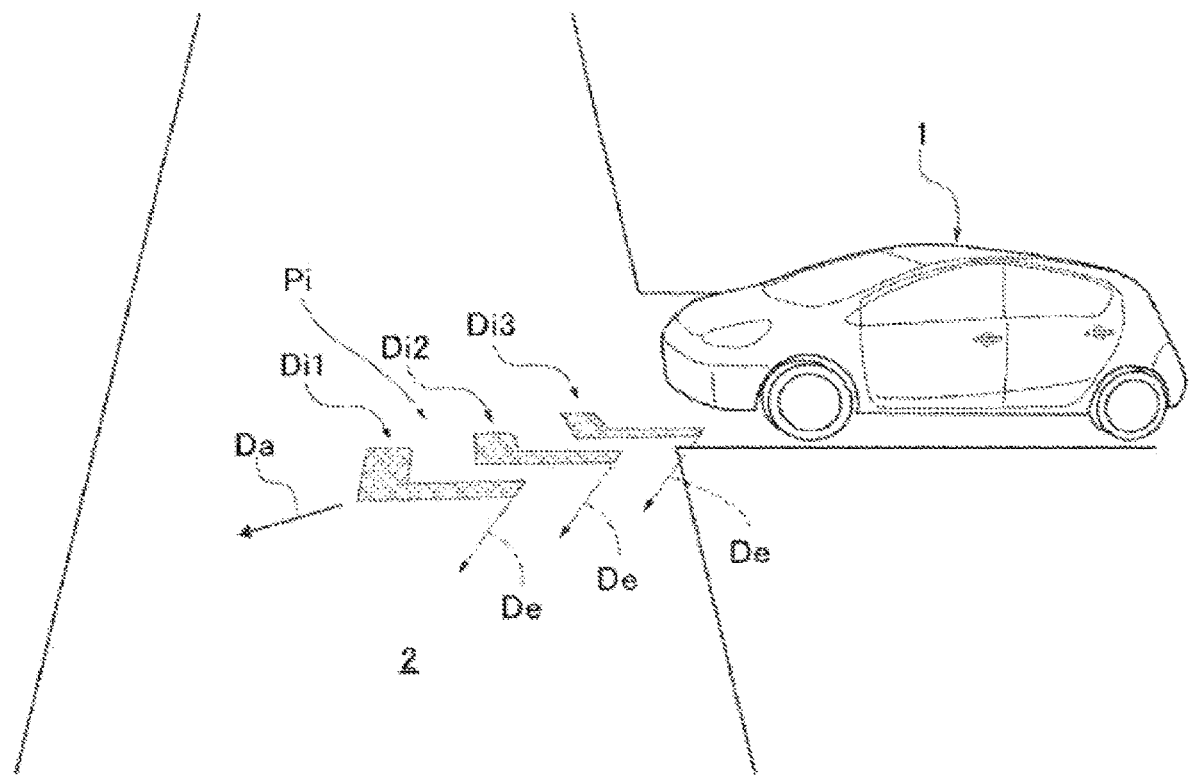
FIG. 15 is an explanatory diagram illustrating a usage example that is an example of the irradiation pattern formed by the vehicular lamp.

The vehicular lamp 10 is interlocked with turn lamps and, when either the right or left turn lamp is turned on, the first light source 21 and the second light source 22 provided on the turned-on side are turned on to form the irradiation pattern Pi on the road surface 2. For example, the example illustrated in FIG. 15 illustrates a scene in which the vehicle 1 is coming out of an alley with poor visibility and is about to turn left. In the vehicle 1, when the turn lamp on the left side is flashed, the vehicular lamp 10 provided on the front left forms the irradiation pattern Pi on the road surface 2. Then, even if a person present at the front side when viewing FIG. 15 from the front cannot see the vehicle 1, he/she can see the irradiation pattern Pi formed on the road surface 2.

In particular, the vehicular lamp 10 has, in each irradiation drawing pattern Di of the irradiation pattern Pi to be formed, the two side ends Die inclined inward with respect to the arrow direction Da. Due to this, the vehicular lamp 10 can show each side end Die as a line more inclined toward a direction to turn than the irradiation pattern Pi (arrow direction Da thereof), which is formed toward the direction to turn. Thus, the vehicular lamp 10 can, for example, make the irradiation pattern Pi formed on the left front appear to a person present on the left front side of the vehicle 1 as if the front side end Die (the side end direction De thereof) is directed toward him/herself. As a result, the irradiation pattern Pi does not merely indicate the arrow direction Da to that person, but allows the vehicular lamp 10 to make that person realize that the vehicular lamp 10 intends to turn to the outer side from the arrow direction Da, i.e., to the direction in which the person is located.

In addition, in the vehicle 1, the left and right vehicular lamps 10 are interlocked with the turn lamps, so that when hazard lamps are turned on, the left and right vehicular lamps 10, simultaneously form the irradiation patterns Pi on the road surface 2 (see FIG. 1). Due to this, it is possible to ensure that the vehicular lamps 10 cause a person in the surrounding area of the vehicle 1 to recognize that hazard lamps are turned on, as compared to a case where only the right and left turn-signal lamps are flashed.

Since the vehicular lamp 10 directs the light from the first light source 21 and the second light source 22 to the filter 13, the brightness of the irradiation pattern Pi to be formed through the irradiation slit 26 thereof can be sufficient. Here, the first light source 21 and the second light source 22 generate heat respectively, so they can dissipate heat well by placing them at an interval from each other.

Here, a vehicular lamp as a comparative example (hereinafter referred to as a comparative vehicular lamp) will be described. Similar to the vehicular lamp 10, the comparative vehicular lamp is configured to form an irradiation pattern by condensing light from a light source on a filter with a condenser lens and projecting the light with a projection lens. When two light sources are placed at an interval from each other, the peaks of light quantity formed by the two light sources on the filter are formed far apart in the comparative vehicular lamp. This causes light irregularities in the irradiation pattern formed, and the light irregularities become more conspicuous and noticeable when the two light sources are placed at a larger interval than the dimensions of the light emitting surfaces of the both. In other words, if the two light sources are placed with a larger interval than for each light emitting surface, considering the two light sources as a single light source becomes difficult in the comparative vehicular lamp, to result in two peaks formed on the filter, thereby causing light irregularities in the irradiation pattern.

In contrast, the vehicular lamp 10 is provided with a first incidence surface part 34 and a second incidence surface part 35 on an incidence surface 31 in a condenser lens 12 that condenses light from two light sources (21, 22) with an interval d equal to or larger than the width dimension w at both light emitting surfaces (21a, 22a). The first incidence surface part 34 is optically set to target the first light source 21, and the second incidence surface part 35 is optically set to target the second light source 22. Then, in the condenser lens 12, an emission surface 32 is optically set together with the first incidence surface part 34 and the second incidence surface part 35 in a manner that the light from the first light source 21 and the second light source 22 incident from the first incidence surface part 34 and the second incidence surface part 35 becomes a light distribution with a single high light quantity area HA (peak of light quantity) in the parallel direction Dp (width direction) on the filter 13. Due to this, the vehicular lamp 10 can form a bright irradiation pattern Pi with suppressed light irregularities while properly cooling both light sources (21, 22).

In particular, in the vehicular lamp 10 of the first embodiment, the condenser lens 12 projects the light from the first light source 21 through the first incidence surface part 34 onto the filter 13 thereby to make a light distribution with a high light quantity portion Ha1 in the light distribution near the projection optical axis Lp in the second light shielding area As2. Also, in the vehicular lamp 10, the condenser lens 12 projects the light from the second light source 22 through the second incidence surface part 35 onto the filter 13 thereby to make a light distribution with a high light quantity portion (inverted high light quantity portion Ha1) in the light distribution near the projection optical axis Lp in the first light shielding area As1. Then, in the vehicular lamp 10, the condenser lens 12 arranges the above two high light quantity portions without any gaps between them in the parallel direction Dp thereby to form a long high light quantity area HA in the width direction straddling the projection optical axis Lp without any interruption on the projection optical axis Lp. In other words, the condenser lens 12 adjusts the position and shape of the high light quantity portion Ha1 in the light distribution formed by the light L1 from the first light source 21 through the first incidence surface part 34 so that a single high light quantity area HA is formed when the light distribution is inverted and superimposed. As a result, the vehicular lamp 10 can form a high light quantity area HA over the almost entire area of the first slit part 271 extending in the width direction on the filter 13, and the brightness of the first irradiation drawing pattern Di1 formed furthest away from the first slit part 271 can be secured and made approximately uniform.

Here, the conventional vehicular lamps described in the prior art documents have multiple light guides individually corresponding to multiple light sources. Even when the light guides are integrated, each light guide individually has a rod-shape corresponding to a light source, and guides only the light from the corresponding light source onto the light shielding member. As a result, conventional vehicular lamps have complex configurations, requiring multiple rod-shaped light guides to be arranged for light sources. In addition, in conventional vehicular lamps, the light from the corresponding light source is guided onto the light shielding member for each light guide, so that light is guided on the light shielding member separately for each light source. This makes it difficult to adjust a conventional vehicular lamp to form a light distribution with a single high light quantity area (peak of light quantity) on the light shielding member by optimizing it for the irradiation pattern to be formed. This optimization, taking the irradiation pattern Pi of the present application as an example, is to make the light quantity within each slit part 27 approximately uniform, while making the first slit part 271 corresponding to the furthest first irradiation drawing pattern Di1 the brightest and darkening the second slit part 272 and the third slit part 273 in this order. Thus, it is difficult to adjust the conventional vehicular lamps to form a light distribution in which the light quantity is varied in the upper-lower direction where each slit part 27 is aligned while the light quantity is approximately uniform in the width direction orthogonal to the upper-lower direction in the irradiation pattern Pi.

In contrast, the vehicular lamp 10 is provided with a single condenser lens 12 for the first light source 21 and the second light source 22, which directs the light from each of the light sources inward while emitting the light from the same emission surface 32, thereby making the desired light distribution on the filter 13 with the condenser lens 12. Due to this, the vehicular lamp 10 may be simplified compared to conventional vehicular lamps while maintaining sufficient brightness of the irradiation pattern Pi to be formed. In addition, the vehicular lamp 10 uses a single condenser lens 12 to direct the light from the first light source 21 and the light from the second light source 22 inward and emit the light from the same emission surface 32 and condense the light, so that the light from both light sources can be directed onto the filter 13 together. Due to this, compared to conventional vehicular lamps, the vehicular lamp 10 is easier to be adjusted to form a light distribution with a single high light quantity area HA (peak of light quantity) on the filter 13.

The vehicular lamp 10 according to the first embodiment may obtain each of the following operational effects.

The vehicular lamp 10 has two light sources (21, 22) arranged side by side in the parallel direction Dp with an interval d equal to or larger than the width dimension w of both light emitting surfaces (21a, 22a). Then, in the vehicular lamp 10, the condenser lens 12 condenses the light from both light sources (21, 22) to make a light distribution with a single high light quantity area HA in the parallel direction Dp on the light shielding member (filter 13 in the first embodiment). Due to this, the vehicular lamp 10 can form a light distribution with a single high light quantity area HA on the light shielding member while properly cooling the two light sources (21, 22). As a result, the vehicular lamp 10 can simplify the configuration of the condenser lens 12 and form a bright irradiation pattern Pi with suppressed light irregularities.

In addition, in the vehicular lamp 10, the condenser lens 12 projects the light from the first light source 21 through the first incidence surface part 34 onto the light shielding member thereby to form a high light quantity portion Ha1 of the light distribution in the second light shielding area As2. Also, in the vehicular lamp 10, the condenser lens 12 projects the light from the second light source 22 through the second incidence surface part 35 onto the light shielding member (filter 13) thereby to form a high light quantity portion (inverted high light quantity portion Ha1) of the light distribution in the first light shielding area As1. Then, in the vehicular lamp 10, the condenser lens 12 arranges the above two high light quantity portions without any gaps between them in the parallel direction Dp thereby to form a high light quantity area HA. Due to this, the vehicular lamp 10 can, on the light shielding member, make a light distribution with a long high light quantity area HA in the width direction straddling the projection optical axis Lp.

Furthermore, the vehicular lamp 10 has an incidence surface 31 having, in the parallel direction Dp, an intermediate incidence surface part 36 between the first incidence surface part 34 and the second incidence surface part 35, and the intermediate incidence surface part 36 is a plane parallel to the parallel direction Dp. Due to this, the vehicular lamp 10 can suppress the formation of unnecessarily bright areas on the light shielding member accompanying the setting of the first incidence surface part 34 and the second incidence surface part 35 as described above.

In the vehicular lamp 10, the emission surface 32 of the condenser lens 12 has, in the parallel direction Dp, a vertex that is convex to the light shielding member side in the intermediate range Mr where the intermediate incidence surface part 36 is provided. This facilitates the molding of the emission surface 32, including the area around the vertex, of the vehicular lamp 10.

Accordingly, the vehicular lamp 10 of the first embodiment as the vehicular lamp according to the present disclosure can make the light distribution on the light shielding member (filter 13) as desired while having a simple configuration.

Although the vehicular lamp of the present disclosure has been described on the basis of the first embodiment, the specific configuration is not limited to that of the first embodiment, and design changes and additions are allowed without deviation from the gist of the invention according to each claim of the invention.

Further, in the first embodiment, the irradiation pattern Pi is constituted by aligning three irradiation drawing patterns Di at substantially equal intervals in the direction away from the vehicle 1. However, provided that the irradiation pattern is formed on the road surface 2 around the vehicle 1 and is the one that informs any person around the vehicle 1 of some intention of the driver, the pattern, position to be formed and the like may be anything as long as being set as appropriate and is not limited to the configuration of the first embodiment. In addition, although the vehicular lamp 10 is interlocked with turn lamps in the first embodiment, it may be interlocked with other lamps, such as back-up lights, or may be operated individually, and is not limited to the configuration of the first embodiment. Then, if the vehicular lamp is installed on the vehicle 1 according to the position of the irradiation pattern to the vehicle 1, it may be housed in the door mirror, placed in the light chamber of the tail light (light chambers on left and right sides at the rear of the vehicle), or installed in the body of the vehicle, and is not limited to the configuration of the first embodiment.

Figure 16:
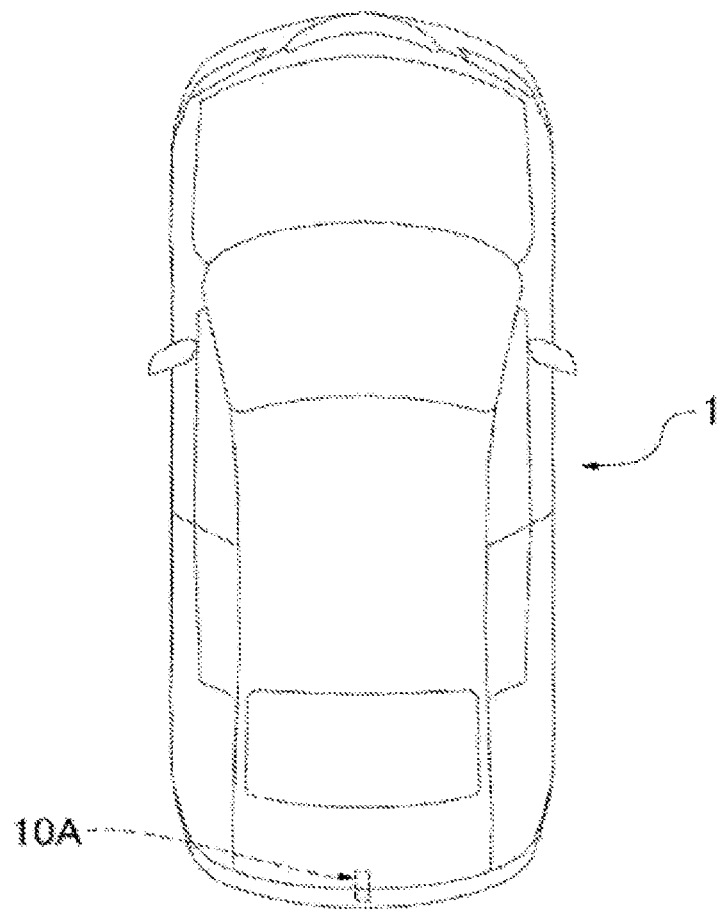
FIG. 16 is an explanatory diagram illustrating a state where a vehicular lamp according to an other example of the present disclosure is mounted on a vehicle to form an irradiation pattern.
Figure 16:
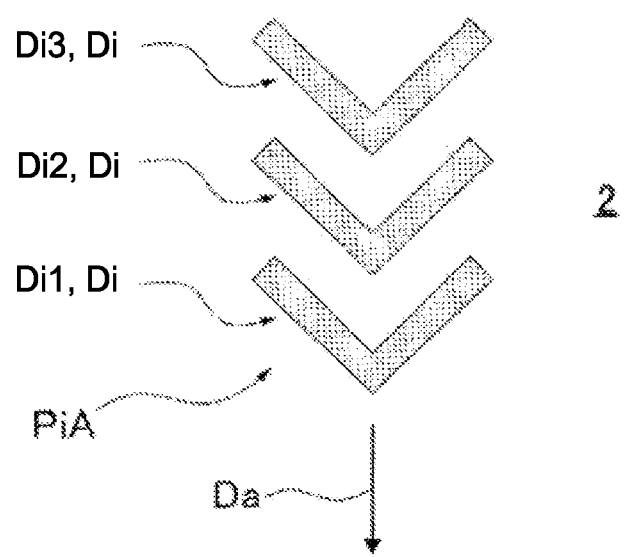

An other example of the vehicular lamp is illustrated in FIG. 16. The vehicular lamp 10A in FIG. 16 forms an irradiation pattern PiA on a rear side of traveling direction of the vehicle 1. This irradiation pattern PiA is formed by three irradiation drawing patterns Di similar to the first embodiment, arranged in the traveling direction of the vehicle 1. The vehicular lamp 10A is positioned in the rear light chamber of the vehicle or rear part of the vehicle body, such as a high-mounted stop lamp, toward the rear side of traveling direction of the vehicle 1. The vehicular lamp 10A is designed such that the first light source 21 and the second light source 22 in the light source part 11 emit white light. The vehicular lamp 10A is interlocked with the back-up light, and when the back-up light is turned on, the irradiation pattern PiA is formed on the road surface 2 to indicate the direction in which the vehicle 1 moves backward. The irradiation pattern PiA can inform and alert any person in the vicinity of behind the vehicle 1 that the vehicle 1 is moving backward. Then, the vehicular lamp 10A forms the same white irradiation pattern PiA as the interlocked back-up light, so the discomfort of interlocking is suppressed. Further, the vehicular lamp 10A may, for example, form a rectangular irradiation pattern, or any other shape of irradiation pattern, as long as it forms a white irradiation pattern interlocked with the back-up light, and is not limited to this other example.

In addition, in the first embodiment (including the other example above (hereinafter the same)), the brightness for each slit part 27 is approximately uniform in the width direction. However, the condenser lens 12 is not limited to the configuration of the first embodiment, as long as it makes a light distribution with a single high light quantity area (HA) in the parallel direction Dp of the two light sources (21, 22) on the light shielding member (filter 13). In other words, the parallel direction Dp may be set appropriately according to the shape and mode of the irradiation pattern to be formed, and is not limited to the configuration of the first embodiment.

Furthermore, in the first embodiment, the filter 13 that allows light condensed by the condenser lens 12 to transmit through the irradiation slit 26 is used as the light shielding member. However, the light shielding member may be of any other configuration as long as it is provided with the irradiation slit 26 that partially passes the light condensed by the condenser lens 12, and is not limited to the configuration of the first embodiment. As an exemplary other configuration, such a light shielding plate may be used, which is made of a plate-like member not allowing light to pass through, and has an irradiation slit penetrating through the member, allowing light that has passed through the condenser lens 12 to pass through the irradiation slit.

In the first embodiment, vehicular lamps 10 and 10A are installed in a vehicle 1 driven by a driver. However, vehicular lamps may be installed in vehicles with automatic driving functions and are not limited to the configuration of the first embodiment. In this case, the vehicular lamp is not limited to the configuration of the first embodiment, as long as the irradiation pattern is formed at a timing appropriate to the application for which it is provided, i.e., according to some intention regarding the operation of the vehicle 1.

In the first embodiment, the light source part 11 is installed on the installation base part 16 that functions as a heat sink (heat dissipation portion 16b), and this installation base part 16 is connected to the housing 15. However, the light source part may be located at the end part of the housing and may be of any other configuration, and a vehicular lamp is not limited to the configuration of the first embodiment in this regard, as long as the light from the light source part is condensed on the light shielding member by a condenser lens and projected by a projection lens to form an irradiation pattern.

DESCRIPTION OF REFERENCE NUMERALS 10, 10A vehicular lamp
12 condenser lens
13 filter (as an example of a light shielding member)
14 projection lens
21 first light source
21a (as an example of a light emitting surface) first light emitting surface
22 second light source
22a (as an example of a light emitting surface) second light emitting surface
26 irradiation slit
31 incidence surface
32 emission surface
34 first incidence surface part
35 second incidence surface part
36 intermediate incidence surface part As1 first light shielding area
As2 second light shielding area
Dp parallel direction
HA high light quantity area
Ha high light quantity portion
Lr lens axis
Pi, PiA irradiation pattern;

The invention claimed is:

1. A vehicular lamp, comprising:
a first light source and a second light source, each having a light emitting surface and being arranged in a predetermined parallel direction;
a single condenser lens for condensing light emitted from the first light source and the second light source;
a light shielding member provided with an irradiation slit through which light condensed by the condenser lens is partially passed; and
a projection lens for projecting light passed through the light shielding member to form an irradiation pattern, wherein:
the first light source and the second light source are arranged with an interval equal to or larger than dimensions in the parallel direction on the light emitting surfaces,
the condenser lens makes a light distribution with a single high light quantity area with the highest light quantity in the parallel direction on the light shielding member.

2. The vehicular lamp according to the claim 1, wherein:
the condenser lens has an incidence surface to which light from the first light source and the second light source is incident,
the incidence surface has a first incidence surface part that is on the first light source side and a second incidence surface part that is on the second light source side in the parallel direction,
in the light shielding member, in the parallel direction, the first incidence surface part side is a first light shielding area and the second incidence surface part side is a second light shielding area, and
the condenser lens projects light emitted from the first light source and incident from the first incidence surface part onto the light shielding member to form a high light quantity portion of the light distribution in the second light shielding area, while the condenser lens projects light emitted from the second light source and incident from the second incidence surface part onto the light shielding member to form a high light quantity portion of the light distribution in the first light shielding area, and the high light quantity area is formed by arranging the two high light quantity portions without any gaps between them in the parallel direction.

3. The vehicular lamp according to the claim 2, wherein:
the incidence surface has an intermediate incidence surface part between the first incidence surface part and the second incidence surface part in the parallel direction, and
the intermediate incidence surface part is a plane parallel to the parallel direction.

4. The vehicular lamp according to the claim 3, wherein:
the condenser lens has an emission surface that emits light from the first light source and light from the second light source, and
the emission surface has, in the parallel direction, a vertex that is convex to the light shielding member side in a range where the intermediate incidence surface part is provided.

* * * * *